United States Patent
Wang et al.

(10) Patent No.: US 12,229,779 B2
(45) Date of Patent: Feb. 18, 2025

(54) METHOD, SYSTEM, AND COMPUTER PROGRAM PRODUCT FOR DETECTING GROUP ACTIVITIES IN A NETWORK

(71) Applicant: Visa International Service Association, San Francisco, CA (US)

(72) Inventors: Liang Wang, San Jose, CA (US); Junpeng Wang, San Jose, CA (US); Chiranjeet Chetia, Round Rock, TX (US); Shi Cao, Austin, TX (US); Harishkumar Sundarji Majithiya, Austin, TX (US); Roshni Ann Samuel, Cedar Park, TX (US); Minghua Xu, Austin, TX (US); Wei Zhang, Fremont, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/137,524

(22) Filed: Dec. 30, 2020

(65) Prior Publication Data
US 2021/0209604 A1 Jul. 8, 2021

Related U.S. Application Data

(60) Provisional application No. 62/957,570, filed on Jan. 6, 2020.

(51) Int. Cl.
*G06Q 20/40* (2012.01)
*G06F 21/55* (2013.01)

(52) U.S. Cl.
CPC ....... *G06Q 20/4016* (2013.01); *G06F 21/552* (2013.01)

(58) Field of Classification Search
CPC .. G06Q 20/4016; G06Q 20/401; G06Q 20/40; G06Q 20/38; G06Q 20/00;
(Continued)

(56) References Cited

U.S. PATENT DOCUMENTS 7,376,618 B1 * 5/2008 Anderson .............. G06Q 40/12
705/38
9,798,876 B1 * 10/2017 Parker-Wood ........ G06F 21/552
(Continued)

FOREIGN PATENT DOCUMENTS

CN 117716377 A 3/2024

OTHER PUBLICATIONS

Cao et al., "TitAnt: Online Real-time Transaction Fraud Detection in Ant Financial" (http://www.vldb.org/pvldb/vol12/p2082-cao.pdf).
(Continued)

*Primary Examiner* — Matthew S Gart
*Assistant Examiner* — Divesh Patel
(74) *Attorney, Agent, or Firm* — The Webb Law Firm

(57) ABSTRACT

Provided is a method for detecting group activities in a network. The method may include receiving interaction data associated with a plurality of interactions. For each account identifier associated with at least one interaction, a value may be determined for each of a first set of categories, and a vector may be generated based on the value for each category. The length of each vector may be determined. At least one relational graph may be generated based on the interaction data. Each relational graph may be associated with a respective category of a second set of categories. At least one cluster of nodes may be determined based on the relational graph(s). A score for each cluster may be determined based on the length of the vector associated with the
(Continued)

account identifier of each node of the cluster of nodes. A system and computer program product are also disclosed.

20 Claims, 12 Drawing Sheets

(58) Field of Classification Search
CPC ...... G06F 21/552; G06F 21/554; G06F 21/55; G06F 21/50; G06F 21/00
See application file for complete search history.

(56) References Cited

U.S. PATENT DOCUMENTS

| | | | |
|---|---|---|---|
| 11,538,013 B1 | 12/2022 | Sharma | |
| 11,935,060 B1 | 3/2024 | Gibson et al. | |
| 2011/0225076 A1 | 9/2011 | Wang et al. | |
| 2013/0232045 A1* | 9/2013 | Tai | G06Q 10/10 705/35 |
| 2015/0170147 A1 | 6/2015 | Geckle et al. | |
| 2016/0364794 A1* | 12/2016 | Chari | G06Q 40/02 |
| 2018/0158063 A1 | 6/2018 | Jamtgaard et al. | |
| 2018/0218369 A1* | 8/2018 | Xiao | G06Q 20/20 |
| 2019/0130407 A1 | 5/2019 | Adjaoute | |
| 2019/0236608 A1* | 8/2019 | Formsma | G06N 7/01 |
| 2021/0019762 A1* | 1/2021 | Bosnjakovic | G06N 5/022 |
| 2021/0065245 A1* | 3/2021 | Resheff | G06F 16/9035 |
| 2021/0248448 A1 | 8/2021 | Branco et al. | |
| 2021/0256485 A1 | 8/2021 | Fidanza et al. | |
| 2021/0304207 A1 | 9/2021 | Lo Faro et al. | |

OTHER PUBLICATIONS

Wu et al., "Developing an Unsupervised Real-time Anomaly Detection Scheme for Time Series with Multi-seasonality" (https://arxiv.org/pdf/1908.01146.pdf).

Rosvall et al., "Maps of random walks on complex networks reveal community structure", Proceedings of the National Academy of Sciences of the United States of America, 2008, pp. 1118-1123, vol. 105, No. 4.

* cited by examiner

METHOD, SYSTEM, AND COMPUTER PROGRAM PRODUCT FOR DETECTING GROUP ACTIVITIES IN A NETWORK

CROSS REFERENCE TO RELATED APPLICATION

The present application claims the benefit of U.S. Provisional Patent Application No. 62/957,570, filed on Jan. 6, 2020, the disclosure of which is hereby incorporated by reference in its entirety.

BACKGROUND

1. Field

This disclosed subject matter relates generally to methods, systems, and products for detecting group activities in a network and, in some particular embodiments, to a method, system, and computer program product for detecting suspicious group activities in a payment network.

2. Technical Considerations

In certain networks (e.g., computer networks, payment transaction networks, social media networks, and/or the like), malicious users (e.g., hackers, criminals, money launderers, terrorist groups/financers, and/or the like) may attempt to conceal their identity, the source of certain resources (e.g., data, money, media content, and/or the like), the destination/intended recipient of such resources, and/or the like. For example, in a payment transaction network, malicious users may attempt to conceal their identity, the source (e.g., sender) of illegally gained money, and/or the destination (e.g., receiver) of illegally gained money by transferring that money (and/or portions thereof) through different accounts (e.g., a group of accounts and/or the like) that may be associated with nominally different entities and/or spread across different geographical regions. Additionally, such transfers may occur over a period of time, and the frequency of such transfers may not be based on a regular or predictable pattern. Moreover, such accounts may be associated with different issuers.

However, it may be very difficult to detect such activities because the different accounts (e.g., in a group and/or the like) are associated with nominally different entities and/or spread across different geographical regions and/or because the activities (e.g., payment transactions and/or the like) occur over a period of time (e.g., an unpredictable period of time). Moreover, because the accounts may be associated with different issuers, no single issuer may have visibility of the entire group of accounts.

Certain machine learning algorithms may be used to detect fraud and/or risk associated with individual interactions (e.g., payment transactions and/or the like). For example, certain machine learning algorithms may be trained with data (e.g., payment transaction data) that has been separately confirmed to be and/or labeled as fraudulent and/or risky.

However, the number of instances in which a group of accounts has been separately confirmed and/or labeled as taking part in suspicious activities (e.g., payment transactions and/or the like) may be insufficiently small to train certain machine learning algorithms (e.g., supervised machine learning algorithms) because confirmed instances of such activities are very rare.

SUMMARY

Accordingly, it is an object of the presently disclosed subject matter to provide methods, systems, and computer program products for detecting group activities in a network.

According to non-limiting embodiments or aspects or aspects, provided is a method for detecting group activities in a network. In some non-limiting embodiments or aspects or aspects, a method for detecting group activities in a network may include receiving interaction data associated with a plurality of interactions. The interaction data for each interaction of the plurality of interactions may include account identifier data associated with at least one account identifier. For each account identifier associated with at least one interaction (of the plurality of interactions), a value may be determined for each category of a first set of categories based on the interaction data. For each account identifier associated with at least one interaction of the plurality of interactions, a vector may be generated based on the value for each category of the first set of categories. The length of each vector may be determined. At least one relational graph may be generated based on the interaction data. Each relational graph may be associated with a respective category of a second set of categories. Each relational graph may include a plurality of nodes and a plurality of edges. The plurality of nodes may include a node for each account identifier associated with at least one interaction (of the plurality of interactions). The plurality of edges may include an edge connecting each respective node of the plurality of nodes with each other node of the plurality of nodes having a same value of the respective category as the respective node. At least one cluster of nodes may be determined based on the at least one relational graph. A score for each cluster (of the at least one cluster) may be determined based on the length of the vector associated with the account identifier of each node of the cluster of nodes.

In some non-limiting embodiments or aspects, the plurality of interactions may include a plurality of payment transactions. Additionally or alternatively, the account identifier data for each payment transaction of the plurality of payment transactions may include at least one of a primary account number (PAN), a payment token, or any combination thereof.

In some non-limiting embodiments or aspects, the at least one relational graph may include a plurality of relational graphs. Additionally or alternatively, the plurality of relational graphs may be combined to form a combined graph. The combined graph may include the plurality of nodes and a plurality of weighted edges. The plurality of edges may include a weighted edge corresponding to each edge of the plurality of edges of all of the plurality of relational graphs. A weight of each respective weighted edge may be based on a number of the plurality of relational graphs having at least one edge of the plurality of edges thereof corresponding to the respective weighted edge.

In some non-limiting embodiments or aspects, determining the at least one cluster of nodes may include determining the at least one cluster of nodes based on the combined graph. Additionally or alternatively, determining the score may include determining a weighted score for each cluster (of the at least one cluster) based on the length of the vector associated with the account identifier of each respective node of the cluster of nodes and the weight of the weighted edges connected to each respective node of the cluster of nodes. Additionally or alternatively, the score may be and/or may include the weighted score. In some non-limiting embodiments or aspects, the weighted score may include at least one of a weighted average based on the length of the vector associated with the account identifier of each respective node of the cluster of nodes and the weight of the weighted edges connected to each respective node of the cluster of nodes, a multiplication product based on the length of the vector associated with the account identifier of each respective node of the cluster of nodes and the weight of the weighted edges connected to each respective node of the cluster of nodes, any combination thereof, and/or the like.

In some non-limiting embodiments or aspects, at least a subset (e.g., a first subset) of the first set of categories may include at least a subset (e.g., a second subset) of the second set of categories.

In some non-limiting embodiments or aspects, the at least one account identifier may include a first account identifier associated with a sender and a second account identifier associated with a receiver.

In some non-limiting embodiments or aspects, the second set of categories may include a sender category. Additionally or alternatively, the at least one relational graph may include a sender relational graph. Additionally or alternatively, the plurality of edges of the sender relational graph may include the edge connecting each respective node of the plurality of nodes with each other node of the plurality of nodes having the first account identifier associated with the sender of at least one interaction associated with the other node matching the first account identifier associated with the sender of at least one interaction associated with the respective node.

In some non-limiting embodiments or aspects, the second set of categories may include a receiver category. Additionally or alternatively, the at least one relational graph may include a receiver relational graph. Additionally or alternatively, the plurality of edges of the receiver relational graph may include the edge connecting each respective node of the plurality of nodes with each other node of the plurality of nodes having the second account identifier associated with the receiver of at least one interaction associated with the other node matching the second account identifier associated with the receiver of at least one interaction associated with the respective node.

In some non-limiting embodiments or aspects, determining the at least one cluster of nodes may include determining the at least one cluster of nodes based on the at least one relational graph using at least one of a community detection algorithm, a random walk algorithm, any combination thereof, and/or the like.

In some non-limiting embodiments or aspects, at least one further interaction may be denied based on the score. Additionally or alternatively, a case investigation may be opened based on the score. Additionally or alternatively, at least one notification may be communicated based on the score. Additionally or alternatively, a graphical user interface may be displayed based on the score.

According to non-limiting embodiments or aspects, provided is a system for detecting group activities in a network. In some non-limiting embodiments or aspects, the system for detecting group activities in a network may include at least one processor and at least one non-transitory computer-readable medium comprising instructions to direct the at least one processor to receive interaction data associated with a plurality of interactions. The interaction data for each interaction of the plurality of interactions may include account identifier data associated with at least one account identifier. For each account identifier associated with at least one interaction (of the plurality of interactions), a value may be determined for each category of a first set of categories based on the interaction data. For each account identifier associated with at least one interaction of the plurality of interactions, a vector may be generated based on the value for each category of the first set of categories. The length of each vector may be determined. At least one relational graph may be generated based on the interaction data. Each relational graph may be associated with a respective category of a second set of categories. Each relational graph may include a plurality of nodes and a plurality of edges. The plurality of nodes may include a node for each account identifier associated with at least one interaction (of the plurality of interactions). The plurality of edges may include an edge connecting each respective node of the plurality of nodes with each other node of the plurality of nodes having a same value of the respective category as the respective node. At least one cluster of nodes may be determined based on the at least one relational graph. A score for each cluster (of the at least one cluster) may be determined based on the length of the vector associated with the account identifier of each node of the cluster of nodes.

In some non-limiting embodiments or aspects, the plurality of interactions may include a plurality of payment transactions. Additionally or alternatively, the account identifier data for each payment transaction of the plurality of payment transactions may include at least one of a primary account number (PAN), a payment token, or any combination thereof.

In some non-limiting embodiments or aspects, the at least one relational graph may include a plurality of relational graphs. Additionally or alternatively, the plurality of relational graphs may be combined to form a combined graph. The combined graph may include the plurality of nodes and a plurality of weighted edges. The plurality of edges may include a weighted edge corresponding to each edge of the plurality of edges of all of the plurality of relational graphs. A weight of each respective weighted edge may be based on a number of the plurality of relational graphs having at least one edge of the plurality of edges thereof corresponding to the respective weighted edge.

In some non-limiting embodiments or aspects, determining the at least one cluster of nodes may include determining the at least one cluster of nodes based on the combined graph. Additionally or alternatively, determining the score may include determining a weighted score for each cluster (of the at least one cluster) based on the length of the vector associated with the account identifier of each respective node of the cluster of nodes and the weight of the weighted edges connected to each respective node of the cluster of nodes. Additionally or alternatively, the score may be and/or may include the weighted score.

In some non-limiting embodiments or aspects, the weighted score may include at least one of a weighted average based on the length of the vector associated with the account identifier of each respective node of the cluster of nodes and the weight of the weighted edges connected to each respective node of the cluster of nodes, a multiplication product based on the length of the vector associated with the account identifier of each respective node of the cluster of nodes and the weight of the weighted edges connected to each respective node of the cluster of nodes, any combination thereof, and/or the like.

In some non-limiting embodiments or aspects, at least a subset (e.g., a first subset) of the first set of categories may include at least a subset (e.g., a second subset) of the second set of categories.

In some non-limiting embodiments or aspects, the at least one account identifier may include a first account identifier associated with a sender and a second account identifier associated with a receiver.

In some non-limiting embodiments or aspects, at least one further interaction may be denied based on the score. Additionally or alternatively a case investigation may be opened based on the score. Additionally or alternatively, at least one notification may be communicated based on the score. Additionally or alternatively, a graphical user interface may be displayed based on the score.

According to non-limiting embodiments or aspects, provided is a computer program product for detecting group activities in a network. The computer program product may include at least one non-transitory computer-readable medium including one or more instructions that, when executed by at least one processor, cause the at least one processor to receive interaction data associated with a plurality of interactions. The interaction data for each interaction of the plurality of interactions may include account identifier data associated with at least one account identifier. For each account identifier associated with at least one interaction (of the plurality of interactions), a value for each category of a first set of categories may be determined based on the interaction data. For each account identifier associated with at least one interaction of the plurality of interactions, a vector may be generated based on the value for each category of the first set of categories. The length of each vector may be determined. At least one relational graph may be generated based on the interaction data. Each relational graph may be associated with a respective category of a second set of categories. Each relational graph may include a plurality of nodes and a plurality of edges. The plurality of nodes may include a node for each account identifier associated with at least one interaction (of the plurality of interactions). The plurality of edges may include an edge connecting each respective node of the plurality of nodes with each other node of the plurality of nodes having a same value of the respective category as the respective node. At least one cluster of nodes may be determined based on the at least one relational graph. A score for each cluster (of the at least one cluster) may be determined based on the length of the vector associated with the account identifier of each node of the cluster of nodes.

Further embodiments or aspects are set forth in the following numbered clauses:

Clause 1: A computer-implemented method, comprising: receiving, with at least one processor, interaction data associated with a plurality of interactions, the interaction data for each interaction of the plurality of interactions including account identifier data associated with at least one account identifier; for each account identifier associated with at least one interaction of the plurality of interactions, determining, with at least one processor, a value for each category of a first set of categories based on the interaction data; for each account identifier associated with at least one interaction of the plurality of interactions, generating, with at least one processor, a vector based on the value for each category of the first set of categories; determining, with at least one processor, a length of each vector; generating, with at least one processor, at least one relational graph based on the interaction data, each relational graph associated with a respective category of a second set of categories, each relational graph comprising a plurality of nodes and a plurality of edges, the plurality of nodes comprising a node for each account identifier associated with at least one interaction of the plurality of interactions, the plurality of edges comprising an edge connecting each respective node of the plurality of nodes with each other node of the plurality of nodes having a same value of the respective category as the respective node; determining, with at least one processor, at least one cluster of nodes based on the at least one relational graph; and determining, with at least one processor, a score for each cluster of the at least one cluster based on the length of the vector associated with the account identifier of each node of the cluster of nodes.

Clause 2: The method of clause 1, wherein the plurality of interactions comprises a plurality of payment transactions, and wherein the account identifier data for each payment transaction of the plurality of payment transactions comprises at least one of a primary account number (PAN), a payment token, or any combination thereof.

Clause 3: The method of clauses 1 or 2, wherein the at least one relational graph comprises a plurality of relational graphs, the method further comprising: combining, with at least one processor, the plurality of relational graphs to form a combined graph, the combined graph comprising the plurality of nodes and a plurality of weighted edges, the plurality of edges comprising a weighted edge corresponding to each edge of the plurality of edges of all of the plurality of relational graphs, a weight of each respective weighted edge based on a number of the plurality of relational graphs having at least one edge of the plurality of edges thereof corresponding to the respective weighted edge.

Clause 4: The method of any preceding clause, wherein determining the at least one cluster of nodes comprises determining the at least one cluster of nodes based on the combined graph, and wherein determining the score comprises determining a weighted score for each cluster of the at least one cluster based on the length of the vector associated with the account identifier of each respective node of the cluster of nodes and the weight of the weighted edges connected to each respective node of the cluster of nodes, wherein the score comprises the weighted score.

Clause 5: The method of any preceding clause, wherein the weighted score comprises at least one of a weighted average based on the length of the vector associated with the account identifier of each respective node of the cluster of nodes and the weight of the weighted edges connected to each respective node of the cluster of nodes, a multiplication product based on the length of the vector associated with the account identifier of each respective node of the cluster of nodes and the weight of the weighted edges connected to each respective node of the cluster of nodes, or any combination thereof.

Clause 6: The method of any preceding clause, wherein a first subset of the first set of categories comprises a second subset of the second set of categories.

Clause 7: The method of any preceding clause, wherein the at least one account identifier comprises a first account identifier associated with a sender and a second account identifier associated with a receiver.

Clause 8: The method of any preceding clause, wherein the second set of categories comprises a sender category, and wherein the at least one relational graph comprises a sender relational graph, the plurality of edges of the sender relational graph comprising the edge connecting each respective node of the plurality of nodes with each other node of the plurality of nodes having the first account identifier associated with the sender of at least one interaction associated with the other node matching the first account identifier associated with the sender of at least one interaction associated with the respective node.

Clause 9: The method of any preceding clause, wherein the second set of categories comprises a receiver category, and wherein the at least one relational graph comprises a receiver relational graph, the plurality of edges of the receiver relational graph comprising the edge connecting each respective node of the plurality of nodes with each other node of the plurality of nodes having the second account identifier associated with the receiver of at least one interaction associated with the other node matching the second account identifier associated with the receiver of at least one interaction associated with the respective node.

Clause 10: The method of any preceding clause, wherein determining the at least one cluster of nodes comprises determining the at least one cluster of nodes based on the at least one relational graph using at least one of a community detection algorithm, a random walk algorithm, or any combination thereof.

Clause 11: The method of any preceding clause, further comprising at least one of: denying at least one further interaction based on the score; opening a case investigation based on the score; communicating at least one notification based on the score; displaying a graphical user interface based on the score; or any combination thereof.

Clause 12: A system, comprising: at least one processor; and at least one non-transitory computer-readable medium comprising instructions to direct the at least one processor to: receive interaction data associated with a plurality of interactions, the interaction data for each interaction of the plurality of interactions including account identifier data associated with at least one account identifier; for each account identifier associated with at least one interaction of the plurality of interactions, determine a value for each category of a first set of categories based on the interaction data; for each account identifier associated with at least one interaction of the plurality of interactions, generate a vector based on the value for each category of the first set of categories; determine a length of each vector; generate at least one relational graph based on the interaction data, each relational graph associated with a respective category of a second set of categories, each relational graph comprising a plurality of nodes and a plurality of edges, the plurality of nodes comprising a node for each account identifier associated with at least one interaction of the plurality of interactions, the plurality of edges comprising an edge connecting each respective node of the plurality of nodes with each other node of the plurality of nodes having a same value of the respective category as the respective node; determine at least one cluster of nodes based on the at least one relational graph; and determine a score for each cluster of the at least one cluster based on the length of the vector associated with the account identifier of each node of the cluster of nodes.

Clause 13: The system of clause 12, wherein the plurality of interactions comprises a plurality of payment transactions, and wherein the account identifier data for each payment transaction of the plurality of payment transactions comprises at least one of a primary account number (PAN), a payment token, or any combination thereof.

Clause 14: The system of clauses 12 or 13, wherein the at least one relational graph comprises a plurality of relational graphs, and wherein the instructions further direct the at least one processor to: combine the plurality of relational graphs to form a combined graph, the combined graph comprising the plurality of nodes and a plurality of weighted edges, the plurality of edges comprising a weighted edge corresponding to each edge of the plurality of edges of all of the plurality of relational graphs, a weight of each respective weighted edge based on a number of the plurality of relational graphs having at least one edge of the plurality of edges thereof corresponding to the respective weighted edge.

Clause 15: The system of any one of clauses 12-14, wherein determining the at least one cluster of nodes comprises determining the at least one cluster of nodes based on the combined graph, and wherein determining the score comprises determining a weighted score for each cluster of the at least one cluster based on the length of the vector associated with the account identifier of each respective node of the cluster of nodes and the weight of the weighted edges connected to each respective node of the cluster of nodes, wherein the score comprises the weighted score.

Clause 16: The system of any one of clauses 12-15, wherein the weighted score comprises at least one of a weighted average based on the length of the vector associated with the account identifier of each respective node of the cluster of nodes and the weight of the weighted edges connected to each respective node of the cluster of nodes, a multiplication product based on the length of the vector associated with the account identifier of each respective node of the cluster of nodes and the weight of the weighted edges connected to each respective node of the cluster of nodes, or any combination thereof.

Clause 17: The system of any one of clauses 12-16, wherein a first subset of the first set of categories comprises a second subset of the second set of categories.

Clause 18: The system of any one of clauses 12-17, wherein the at least one account identifier comprises a first account identifier associated with a sender and a second account identifier associated with a receiver.

Clause 19: The system of any one of clauses 12-18, wherein the instructions further direct the at least one processor to: deny at least one further interaction based on the score; open a case investigation based on the score; communicate at least one notification based on the score; display a graphical user interface based on the score; or any combination thereof.

Clause 20: A computer program product, the computer program product comprising at least one non-transitory computer-readable medium including one or more instructions that, when executed by at least one processor, cause the at least one processor to: receive interaction data associated with a plurality of interactions, the interaction data for each interaction of the plurality of interactions including account identifier data associated with at least one account identifier; for each account identifier associated with at least one interaction of the plurality of interactions, determine a value for each category of a first set of categories based on the interaction data; for each account identifier associated with at least one interaction of the plurality of interactions, generate a vector based on the value for each category of the first set of categories; determine a length of each vector; generate at least one relational graph based on the interaction data, each relational graph associated with a respective category of a second set of categories, each relational graph comprising a plurality of nodes and a plurality of edges, the plurality of nodes comprising a node for each account identifier associated with at least one interaction of the plurality of interactions, the plurality of edges comprising an edge connecting each respective node of the plurality of nodes with each other node of the plurality of nodes having a same value of the respective category as the respective node; determine at least one cluster of nodes based on the at least one relational graph; and determine a score for each cluster of the at least one cluster based on the length of the vector associated with the account identifier of each node of the cluster of nodes.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1:
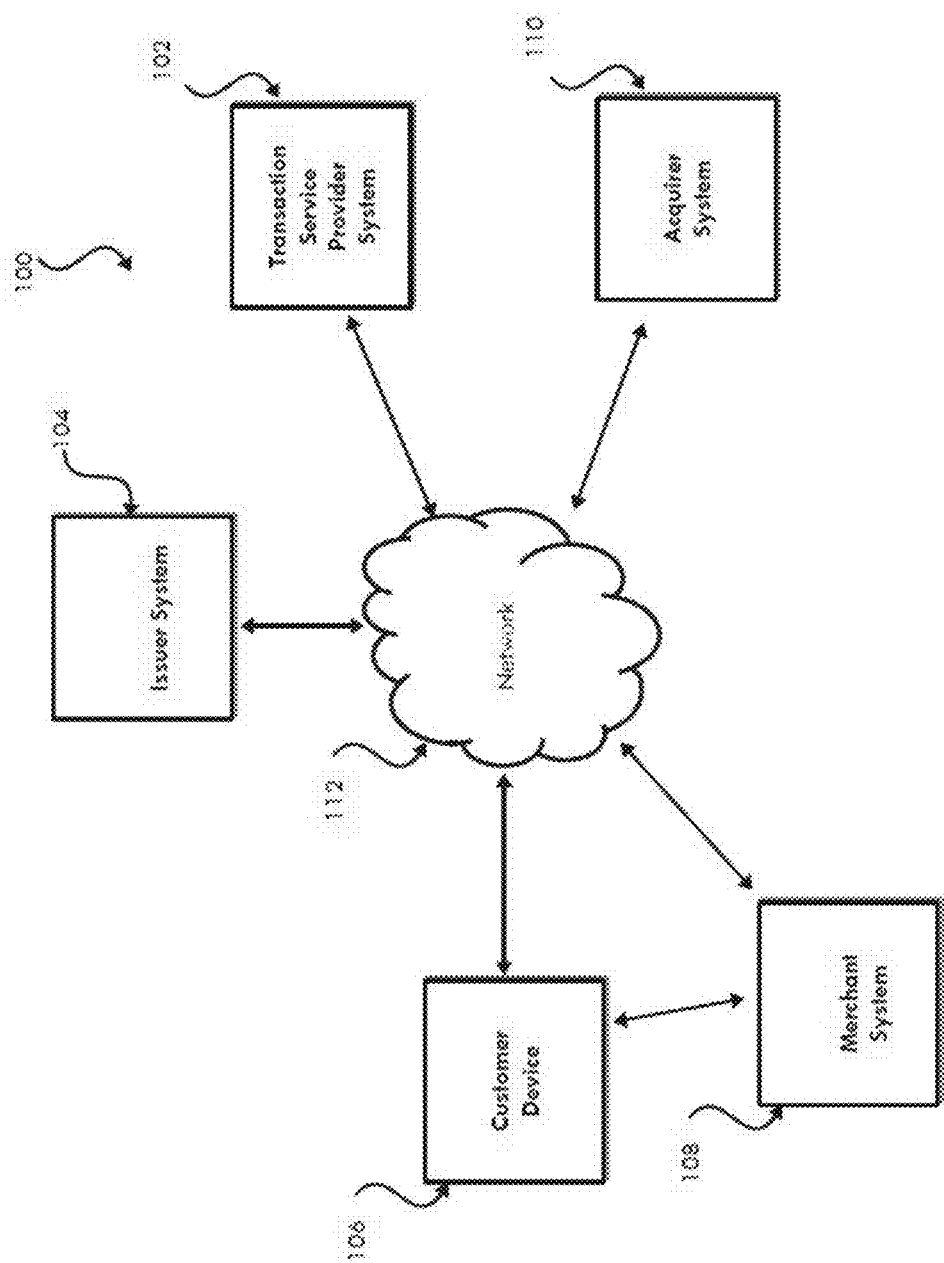
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," and/or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments or aspects, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token life-cycle management related processes, and/or any other token related processes. In some non-limiting embodiments or aspects, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers. In some non-limiting embodiments or aspects, this information may be subject to reporting and audit by the token service provider.

As used herein, the term a "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed BINs as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments or aspects of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for detecting group activities in a network, including, but not limited to, a payment network. For example, non-limiting embodiments or aspects of the disclosed subject matter provide generating a vector for each account identifier associated with at least one interaction of a plurality of interactions based on values for each of a first set of categories, generating at least one relational graph based on a second set of categories to determine (e.g., identify) clusters therein, and determining a score for each cluster based on the vectors associated with the account identifier of each node of the cluster. Such embodiments provide techniques and systems that allow for a score that takes into account both activity of individual accounts/nodes (e.g., the vectors associated therewith) and identification of groups (e.g., clusters of accounts/nodes). Additionally or alternatively, such techniques and systems enable detection of suspicious activities even though such activities are spread among different accounts associated with nominally different entities, different geographical regions, and/or different periods of time since the score takes into account not just the individual accounts but also the identification of groups. Additionally or alternatively, such techniques and systems enable detection of suspicious activities even though accounts may be associated with different issuers since the interaction data (e.g., transaction data) may be collected at a central system (e.g., transaction service provider system) with visibility of all interactions in the network (e.g., payment network). Additionally or alternatively, such techniques and systems enable detection of suspicious activities without the need for labeled training data (e.g., without relying on supervised learning) because generation of the vectors associated individual accounts/nodes and/or identification the clusters of accounts/nodes may be based on unsupervised learning techniques.

For the purpose of illustration, in the following description, while the presently disclosed subject matter is described with respect to methods, systems, and computer program products for detecting group activities in a network, e.g., a payment network, one skilled in the art will recognize that the disclosed subject matter is not limited to the illustrative embodiments. For example, the methods, systems, and computer program products described herein may be used with a wide variety of settings, such as detecting group activities in any setting suitable for a network, e.g., computer network, social media network, and/or the like.

Referring now to FIG. 1, FIG. 1 is a diagram of a non-limiting embodiment of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, and/or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via network 112, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
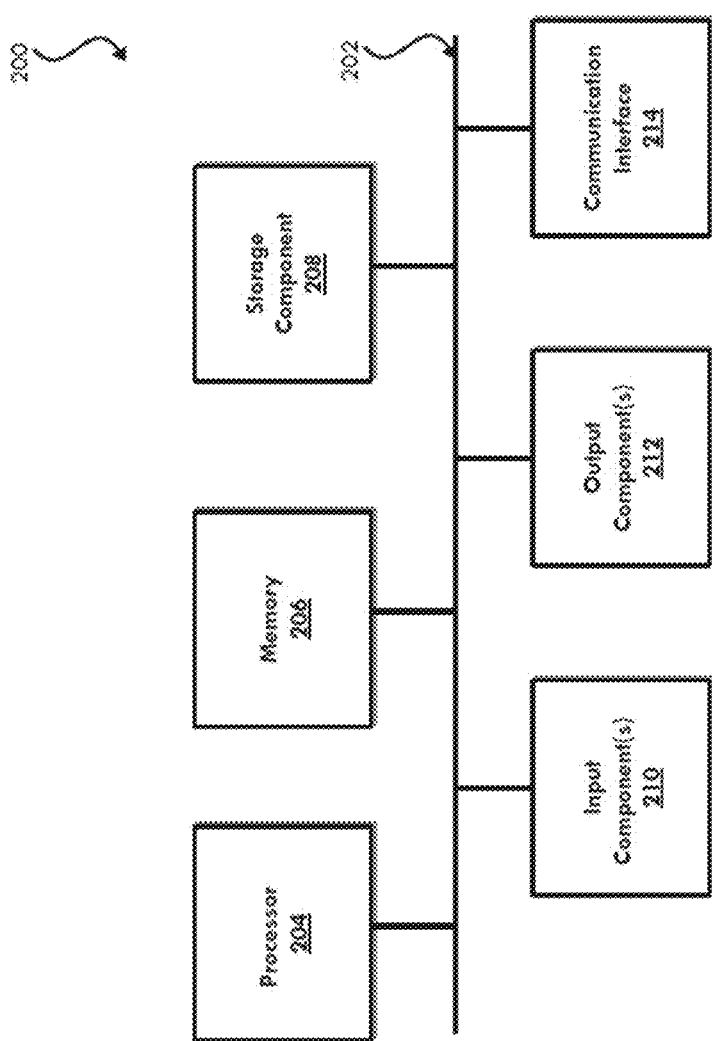
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
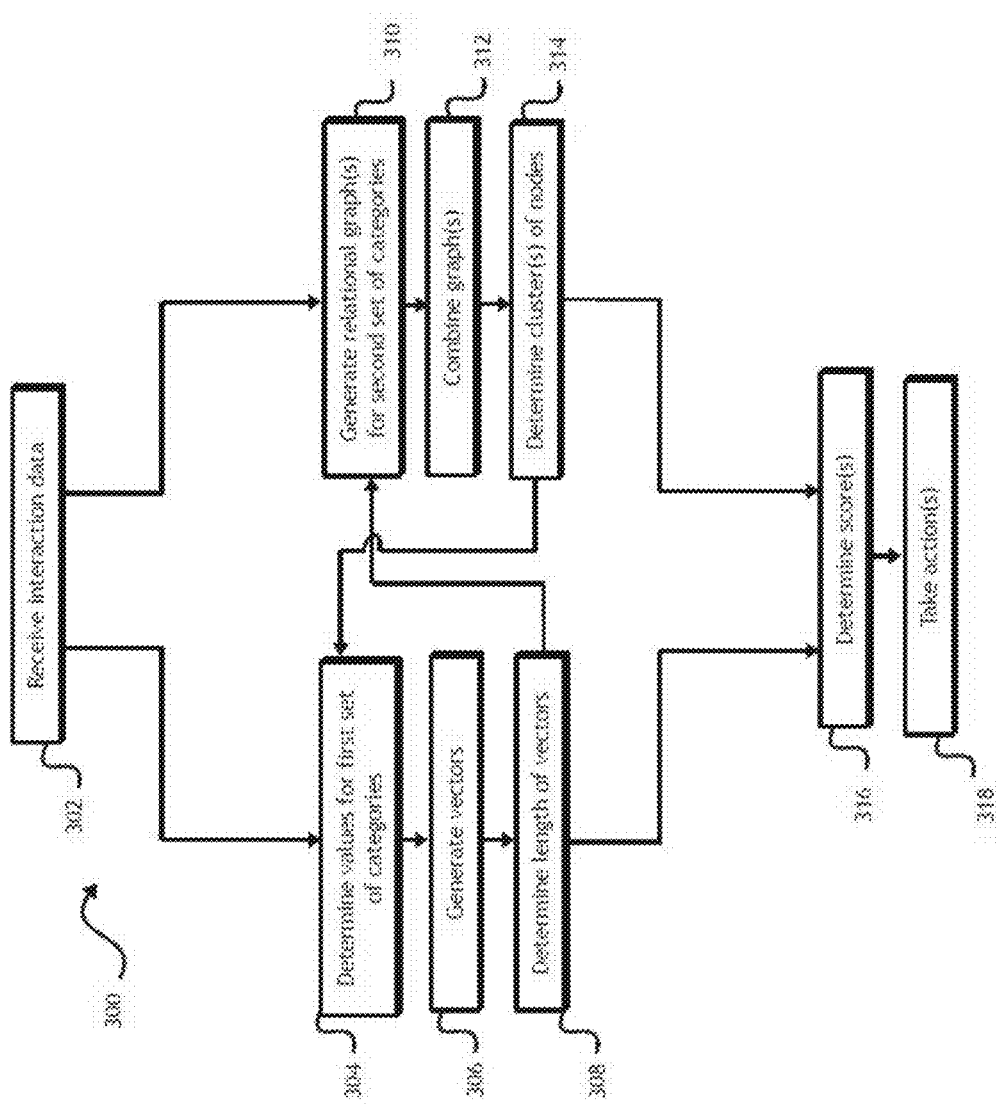
FIG. 3 is a diagram of an implementation of a non-limiting embodiment or aspect of a process for detecting group activities in a network according to the principles of the presently disclosed subject matter.

Referring now to FIG. 3, FIG. 3 is a flowchart of a non-limiting embodiment of a process 300 for detecting group activities in a network. In some non-limiting embodiments or aspects, one or more of the steps of process 300 may be performed (e.g., completely, partially, and/or the like) by transaction service provider system 102 (e.g., one or more devices of transaction service provider system 102). In some non-limiting embodiments or aspects, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), acquirer system 110 (e.g., one or more devices of acquirer system 110), and/or the like.

As shown in FIG. 3, at step 302, process 300 may include receiving interaction data. For example, transaction service provider system 102 may receive (e.g., from issuer system 104, customer device 106, merchant system 108, acquirer system 110, and/or the like) interaction data (e.g., payment transaction data and/or the like) associated with a plurality of interactions (e.g., payment transactions and/or the like). The interaction data for each interaction may include account identifier data associated with at least one account identifier.

In some non-limiting embodiments or aspects, the plurality of interactions may include a plurality of payment transactions. Additionally or alternatively, the account identifier data for each payment transaction may include at least one of a primary account number (PAN), a payment token, any combination thereof, and/or the like.

In some non-limiting embodiments or aspects, the at least one account identifier may include a first account identifier associated with a sender and a second account identifier associated with a receiver As shown in FIG. 3, at step 304, process 300 may include determining values for a first set of categories. For example, transaction service provider system 102 may, for each account identifier associated with at least one interaction of the plurality of interactions, determine a value for each category of a first set of categories based on the interaction data.

As shown in FIG. 3, at step 306, process 300 may include generating vectors. For example, transaction service provider system 102 may, for each account identifier associated with at least one interaction of the plurality of interactions, generate a vector based on the value for each category of the first set of categories.

In some non-limiting embodiments or aspects, the vectors may be generated using at least one of a neural network model, a deep neural network model, a multilayer perceptron model, a convolutional neural network model, a skip-gram model, a continuous bag of words model, any combination thereof, and/or the like. For example, the values for each category of the first set of categories may be provided as input into the aforementioned model to generate the vectors. In some non-limiting embodiments or aspects, each vector may be an embedding vector (e.g., a lower-dimensional vector, a hidden layer vector, a logits layer vector, an output vector, and/or the like). For example, such an embedding vector may be generated using any of the aforementioned models or any combination thereof.

As shown in FIG. 3, at step 308, process 300 may include determining the length of the vectors. For example, transaction service provider system 102 may determine the length of each vector.

In some non-limiting embodiments or aspects, the length of each vector may be associated with a risk score. For example, each risk score may be the length of the respective vector. Additionally or alternatively, each risk score may be calculated based on the length of the respective vector.

As shown in FIG. 3, at step 310, process 300 may include generating at least one relational graph. For example, transaction service provider system 102 may generate at least one relational graph based on the interaction data. In some non-limiting embodiments or aspects, each relational graph may be associated with a respective category of a second set of categories. In some non-limiting embodiments or aspects, each relational graph may include a plurality of nodes and a plurality of edges. For example, the plurality of nodes may include a node for each account identifier associated with at least one interaction of the plurality of interactions. Additionally or alternatively, the plurality of edges may include an edge connecting each respective node of the plurality of nodes with each other node of the plurality of nodes having a same value of the respective category as the respective node.

In some non-limiting embodiments or aspects, at least a subset (e.g., a first subset) of the first set of categories may include at least a subset (e.g., a second subset) of the second set of categories. For example, the second set of categories may be a subset of the first set of categories. Additionally or alternatively, at least some categories of the second set of categories may be the same as at least some categories of the first set of categories.

In some non-limiting embodiments or aspects, the second set of categories may include a sender category. Additionally or alternatively, the at least one relational graph may include a sender relational graph. For example, the plurality of edges of the sender relational graph may include the edge connecting each respective node of the plurality of nodes with each other node of the plurality of nodes having the first account identifier associated with the sender of at least one interaction associated with the other node matching the first account identifier associated with the sender of at least one interaction associated with the respective node.

In some non-limiting embodiments or aspects, the second set of categories may include a receiver category. Additionally or alternatively, the at least one relational graph may include a receiver relational graph. For example, the plurality of edges of the receiver relational graph may include the edge connecting each respective node of the plurality of nodes with each other node of the plurality of nodes having the second account identifier associated with the receiver of at least one interaction associated with the other node matching the second account identifier associated with the receiver of at least one interaction associated with the respective node.

As shown in FIG. 3, at step 312, process 300 may include combining the graphs. For example, the at least one relational graph may include a plurality of relational graphs. Additionally or alternatively, transaction service provider system 102 may combine at least some (e.g., all) of the plurality of relational graphs to form a combined graph. In some non-limiting embodiments or aspects, the combined graph may include the plurality of nodes (e.g., a node in the combined graph corresponding to each node of any of the plurality of graphs) and a plurality of weighted edges. Additionally or alternatively, the plurality of edges may include a weighted edge corresponding to each edge of the plurality of edges of all of the plurality of relational graphs. Additionally or alternatively, a weight of each respective weighted edge may be based on a number of the plurality of relational graphs having at least one edge of the plurality of edges thereof corresponding to the respective weighted edge (e.g., if two graphs have an edge connecting the same two nodes, the weight of a corresponding edge in the combined graph may be 2; if three graphs have an edge connecting the same two nodes, the weight of a corresponding edge in the combined graph may be 3; and/or the like).

As shown in FIG. 3, at step 314, process 300 may include determining (e.g., identifying) at least one cluster of nodes. For example, transaction service provider system 102 may determine (e.g., identify) at least one cluster of nodes based on the at least one relational graph.

In some non-limiting embodiments or aspects, determining the at least one cluster of nodes may include determining the at least one cluster of nodes based on the combined graph.

In some non-limiting embodiments or aspects, determining the at least one cluster of nodes may include determining the at least one cluster of nodes based on the at least one relational graph using at least one of a community detection algorithm, a random walk algorithm, any combination thereof, and/or the like.

As shown in FIG. 3, at step 316, process 300 may include determining at least one score. For example, transaction service provider system 102 may determine a score (e.g., cluster score) for each cluster (e.g., of the at least one cluster) based on the length of the vector (e.g., risk score) associated with the account identifier of each node of the cluster of nodes.

In some non-limiting embodiments or aspects, if a plurality of relational graphs have been combined into a combined graph, determining the score may include determining a weighted score for each cluster (e.g., of the at least one cluster) based on the length of the vector (e.g., risk score) associated with the account identifier of each respective node of the cluster of nodes and the weight of the weighted edges connected to each respective node of the cluster of nodes. Additionally or alternatively, the score may be and/or may include the weighted score.

In some non-limiting embodiments or aspects, the weighted score may include at least one of a weighted average based on the length of the vector (e.g., risk score) associated with the account identifier of each respective node of the cluster of nodes and the weight of the weighted edges connected to each respective node of the cluster of nodes, a multiplication product based on the length of the vector (e.g., risk score) associated with the account identifier of each respective node of the cluster of nodes and the weight of the weighted edges connected to each respective node of the cluster of nodes, any combination thereof, and/or the like.

As shown in FIG. 3, at step 318, process 300 may include taking at least one action. For example, transaction service provider system 102 may take at least one action based on the score(s). For example, transaction service provider system 102 may deny at least one further interaction based on the score. Additionally or alternatively, transaction service provider system 102 may open a case investigation based on the score. Additionally or alternatively, transaction service provider system 102 may communicate at least one notification based on the score. Additionally or alternatively, transaction service provider system 102 may display a graphical user interface based on the score.

The number and arrangement of steps shown in FIG. 3 are provided as an example. In some non-limiting embodiments or aspects, process 300 may include additional steps, fewer steps, different steps, or differently arranged steps than those shown in FIG. 3. Additionally or alternatively, a set of steps (e.g., one or more steps) of process 300 may perform one or more functions described as being performed by another set of steps of process 300.

Figure 4:
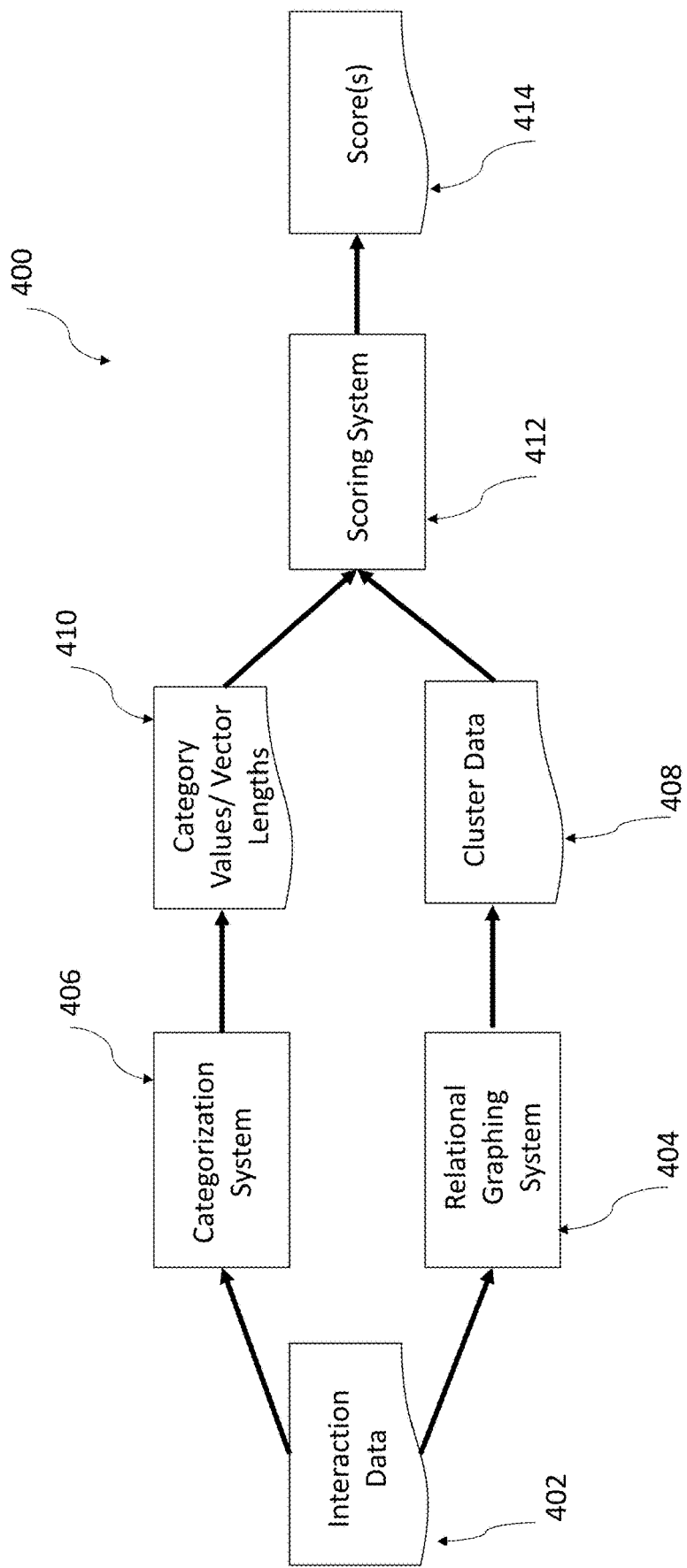
FIG. 4 is a diagram of an exemplary implementation of a non-limiting embodiment or aspect of the process in FIG. 3.

Referring now to FIG. 4, FIG. 4 is a diagram of an exemplary implementation 400 of a non-limiting embodiment or aspect relating to process 300 shown in FIG. 3. As shown in FIG. 4, implementation 400 may include interaction data 402, relational graphing system 404, categorization system 406, cluster data 408, category values/vector lengths 410, scoring system 412, and score(s) 414. In some non-limiting embodiments or aspects, categorization system 406, relation graphing system 404, and/or scoring system 412 may be the same as, similar to, and/or part of transaction service provider system 102.

In some non-limiting embodiments or aspects, interaction data 402 may be received by categorization system 406 and/or relational graphing system 404. Additionally or alternatively, interaction data 402 may include payment transaction data and/or the like.

In some non-limiting embodiments or aspects, in response to receiving the interaction data 402, categorization system 406 may determine values for a set of categories (e.g., a value for each category of the set of categories). For example, categorization system 406 may determine a value for each category of a first set of categories based on the interaction data for each account identifier associated with at least one interaction of the plurality of interactions, as described herein. Additionally or alternatively, categorization system 406 may generate vectors. For example, categorization system 406 may generate a vector for each account identifier associated with at least one interaction of the plurality of interactions based on the values for the first set of categories associated therewith, as described herein. Additionally or alternatively, categorization system 406 may determine the length of vectors. For example, categorization system 406 may determine the length of each vector, as described herein. Additionally or alternatively, categorization system 406 may output category values/vector lengths 410. For example, categorization system 406 may communicate to scoring system 412 category values/vector lengths 410. In some non-limiting embodiments or aspects, category values/vector lengths 410 may include the value for each category of a first set of categories based on the interaction data for each account identifier associated with at least one interaction of the plurality of interactions. Additionally or alternatively, category values/vector lengths 410 may include the lengths of the vectors.

In some non-limiting embodiments or aspects, the categorization 406 may consider a multitude (e.g., set) of categories. For example, such categories may include average throughput, at least one cross-border interaction, at least one anti-money laundering merchant category code, at least one monitored acquirer country, decline rate, long term aggregate of transaction history, daily limit, transaction limit, at least one monitored issuer country, any combination thereof, and/or the like. In some non-limiting embodiments or aspects, the category values/vector lengths 410 may include the output of the categorization system 406. Additionally or alternatively, category values/vector lengths 410 may be received by scoring system 412.

In some non-limiting embodiments or aspects, in response to receiving the interaction data 402, relational graphing system 404 may generate relational graphs for a set of categories. Additionally or alternatively, relational graphing system 404 may build connections between user accounts. For example, relational graphing system 404 may generate a graph including a plurality of nodes and a plurality of edges where the plurality of nodes may include a node for each account identifier associated with at least one interaction of the plurality of interactions. The plurality of edges may include an edge connecting each respective node of the plurality of nodes with each other node of the plurality of nodes having a same value of the respective category as the respective node. Additionally or alternatively, relational graphing system 404 may combine graphs. For example, relational graphing system 404 may combine at least some (e.g., all) of the relational graphs generated to form a combined graph. Additionally or alternatively, the relational graphing system 404 may determine at least one cluster of nodes. For example, the cluster of nodes may be based on the combined graph which may illustrate different layers of connections between the plurality of nodes and the plurality of edges and relational graphing system 404 may determine (e.g., identify) at least one cluster of nodes based on at least one relational graph and/or combined graph. Additionally or alternatively, relational graphing system 404 may output cluster data 408 associated with the at least one cluster and/or communicate cluster data 408 to scoring system 412. For the purpose of illustration, relational graphing system 404 may build connections between two account identifiers (e.g., two PANs) if the account identifiers share at least one sender (e.g., each of the two account identifiers is associated with at least one interaction involving the same sender), which may help identify accounts that are at risk for involvement in suspicious group behavior.

In some non-limiting embodiments or aspects, relational graphing system 404 may consider a multitude (e.g., set) of categories. For example, such categories may include average throughput, at least one cross-border interaction, at least one anti-money laundering merchant category code, at least one monitored acquirer country, decline rate, long term aggregate of transaction history, daily limit, transaction limit, at least one monitored issuer country, any combination thereof, and/or the like. Additionally or alternatively, relational graphing system 404 may output cluster data 408.

In some non-limiting embodiments or aspects, cluster data 408 may be the output of relational graphing system 404. For example, the clusters associated with cluster data 408 may be seen on a relational graph generated by relational graphing system 404. Additionally or alternatively, the clusters may be determined (e.g., identified, mathematically determined, and/or the like) based on the relational graph(s) and/or combined graph(s). Additionally or alternatively, cluster data 408 may be communicated from relational graphing system 404 to scoring system 412 and/or received by scoring system 412 from relational graphing system 404.

In some non-limiting embodiments or aspects, suspicious groups may be assumed to include at least one similarity, e.g., to share something, such as money sending resources, exiting destinations, and/or the like. Such groups may tend to form highly connected clusters, evidenced by the existence of distinct groups of nodes with an excess of connections to each other (e.g., edges connected therebetween and/or the like) and fewer connections to other nodes in the graph. In some non-limiting embodiments or aspects, clusters may be identified by using a community detection algorithm, such as Infomap (M. Rossvall et al., *Maps of Random Walks on Complex Networks Reveal Community Structure*, 105 Proceedings of the National Academy of Sciences of the United States of America, 1118-1123 (2008), the disclosure of which is hereby incorporated by reference in its entirety) to identify clusters from the graph. In some non-limiting embodiments or aspects, the quality function, which may be used to evaluate a partition, may be the minimum description length (MDL) principle. For example, according to the MDL principle, any regularity in data may be used to compress the length of the data. If a community structure (e.g., cluster) is viewed as the regularity in the graph (e.g., relational graph), then such community structures (e.g., clusters) may be detected by finding the partition that gives the minimum description length of the path.

In some non-limiting embodiments or aspects, the quality function may be referred to as a "map equation," which may be calculated using the following equation:

$$L(G) = q_{exit} H(Q) + \sum_{i=1}^{m} p_{within}^{i} H(P^i)$$

where the graph partition is G; the number of nodes is n; the number of communities is m;

$$q_{exit} = \sum_{i=1}^{m} q_{exit}^{i}$$

is the total probability that the random walker exits any of the m communities; $q_{exit}^{i}$ is the probability of the random walker exists the community i;

$$p_{within}^{i} = \sum_{\alpha \in i} p_\alpha + q_{exit}^{i}$$

is the total probability that any node in the community i is vested, plus the probability that the random walker exists the community i;

$$H(Q) = -\sum_{i=1}^{m} \frac{q_{exit}^{i}}{q_{exit}} \log\left(\frac{q_{exit}^{i}}{q_{exit}}\right)$$

is the entropy of movements between communities; and $$H(P^i) = -\frac{q_{exit}^{i}}{q_{exit}^{i} + \sum_{\beta \in i} p_\beta} \log\left(\frac{q_{exit}^{i}}{q_{exit}^{i} + \sum_{\beta \in i} p_\beta}\right) - \sum_{\alpha \varepsilon i} \frac{p_\alpha}{q_{exit}^{i} + \sum_{\beta \in i} p_\beta} \log\left(\frac{p_\alpha}{q_{exit}^{i} + \sum_{\beta \in i} p_\beta}\right)$$

is the entropy of movements within community i.

In some non-limiting embodiments or aspects, the first term of the map equation may be associated with the average number of bits necessary to describe movement of a random walker between communities. Additionally or alternatively, the second term may be associated with the average number of bits necessary to describe movement of a random walker within communities.

For the purpose of illustration and not limitation, H(Q) and H(P) may be replaced in the map equation to provide the following equation:

$$L(G) = \sum_{i=1}^{m} q_{exit}^{i} \log\left(\sum_{i=1}^{m} q_{exit}^{i}\right) - 2\sum_{i=1}^{m} q_{exit}^{i} \log(q_{exit}^{i}) - \sum_{\alpha=1}^{n} p_\alpha \log(p_\alpha) + \sum_{i=1}^{m} \left(q_{exit}^{i} + \sum_{\alpha \in i} p_\alpha\right) \log\left(q_{exit}^{i} + \sum_{\alpha \in iP\alpha}\right)$$

In some non-limiting embodiments or aspects, the map equation may be a function of the node visit probability $p_a$ and the exit probability $q_{exit}^{i}$. Additionally or alternatively, the term $$\sum_{a=1}^{n} p_a \log(p_a)$$

may be independent of partitioning and/or may be dropped.

In some non-limiting embodiments or aspects, the Infomap algorithm may seek to reduce (e.g., minimize) the description length L(G) given by the map equation over possible graph partitions G. The graph partition that gives the shortest description length best captures the community structure (e.g., cluster) of the graph with respect to the dynamics on the graph.

In some non-limiting embodiments or aspects, for a directed, weighted graph, the node visit probability $p_a$ and the exit probability $q_{exit}^{i}$ may be calculated using a PageRank-like algorithm. Additionally or alternatively, for an undirected, weighted graph, the node visit probability may correspond to the relative weight of the edge(s) connected to a given node a, which may be calculated as the total weight of the edge(s) to the node a divided by twice the total weight of all node edges in the graph. The exit probability $q_{exit}^{i}$ may be the relative weight of the community i divided by twice the total weight of all community edges in the graph.

In some non-limiting embodiments or aspects, a graph of nodes associated with account identifiers (e.g., PANs) may be treated as an undirected, weighted graph, e.g., where each node corresponds to an account identifier (e.g., PAN) in the graph. Additionally or alternatively, the edge between two account identifiers (e.g., PANs) may be the Jaccard coefficient.

In some non-limiting embodiments or aspects, in response to receiving the category values/vector lengths 410 and/or the cluster data 408, the scoring system 412 may determine at least one score 414. For example, scoring system 412 may determine a score (e.g., cluster score) for each cluster (e.g., of the at least one cluster) based on the length of the vector (e.g., risk score) associated with the account identifier (e.g., PAN) of each of the cluster of nodes.

In some non-limiting embodiments or aspects, the score (s) 414 may be the output of the scoring system 412. Additionally or alternatively, the score(s) 414 may be used to determine the likelihood of suspicious group activity (e.g., money laundering). For example, at least one score 414 may surface activities at the account identifier (e.g., PAN) level relevant to a specific group activity.

The number and arrangement of systems, devices, and/or components shown in FIG. 4 are provided as an example. In some non-limiting embodiments or aspects, implementation 400 may include additional systems, devices, and/or components; fewer systems, devices, and/or components; different systems, devices, and/or components; or differently arranged systems, devices, and/or components than those shown in FIG. 4. Additionally or alternatively, a set of systems, devices, and/or components (e.g., one or more systems, devices, and/or components) of implementation 400 may perform one or more functions described as being performed by another set of systems, devices, and/or components of implementation 400.

Figure 5:
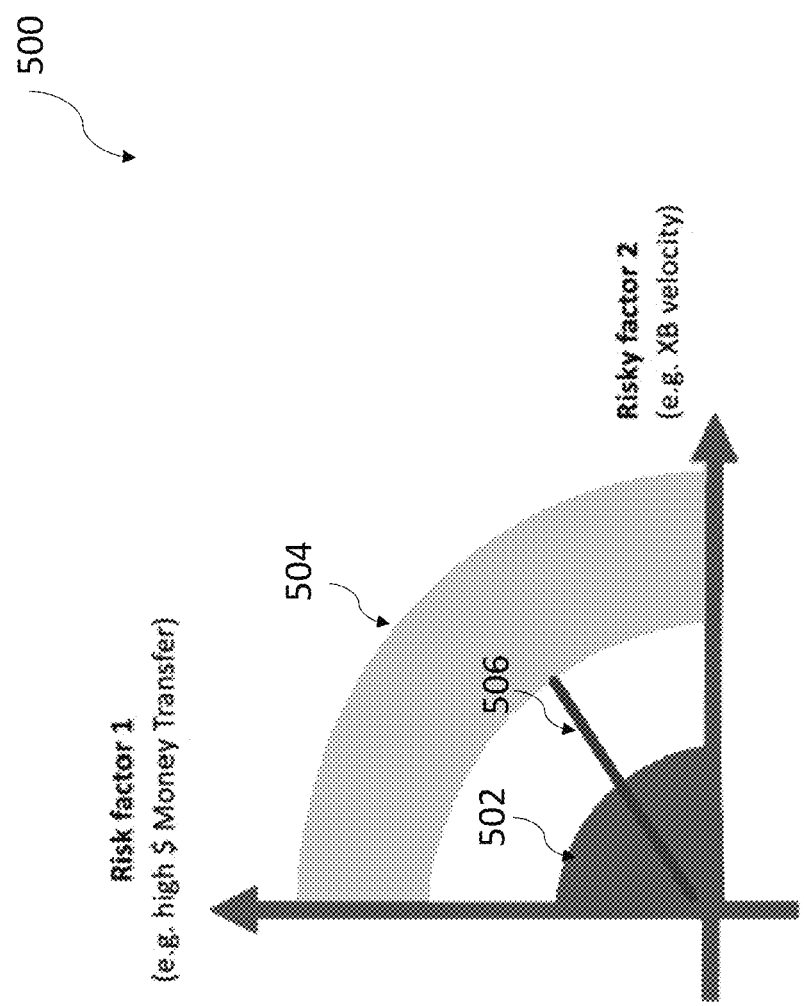
FIG. 5 is a model of an exemplary score risk assessment of a non-limiting embodiment or aspect of the process in FIG. 3.

Referring now to FIG. 5, FIG. 5 is an exemplary score risk assessment model 500 of a non-limiting embodiment or aspect relating to process 300 shown in FIG. 3. In some non-limiting embodiments or aspects, score risk assessment model 500 may be a feature generation model. Additionally or alternatively, score risk assessment model 500 may be an unsupervised model. Additionally or alternatively, score risk assessment model 500 may be aimed at capturing outlying behavior. For example, score risk assessment model 500 may identify outlying data points using interaction data (e.g., payment transaction data and/or the like). Additionally or alternatively, score risk assessment model 500 may consider a multitude (e.g., set) of categories associated with risk. For example, such categories may include average throughput, at least one cross-border interaction, at least one anti-money laundering merchant category code, at least one monitored acquirer country, decline rate, long term aggregate of transaction history, daily limit, transaction limit, at least one monitored issuer country, high dollar amount transfers, the velocity at which a transfer is made, and/or the like. Additionally or alternatively, score risk assessment model 500 may be configurable. For example, risk assessment model 500 may be used to categorize account identifier information (e.g., PANS) into low risk region 502 or high risk region 504. Additionally or alternatively, score risk assessment model 500 may be used to prioritize account identifiers by level of risk. For example, if data is within high risk region 504, the associated account may appear on a list, sorted by highest level of risk to lowest level of risk, which may be investigated by a transaction service provider as described herein. Additionally or alternatively, score risk assessment model 500 may be updated in real time, without the need for pre-training the model.

In some non-limiting embodiments or aspects, score risk assessment model 500 may include vector 506, as shown in FIG. 5. Additionally or alternatively, vector 506 (e.g., the length thereof) may indicate the level of risk of an account identifier based on the values of categories (e.g., risk factors) represented along the horizontal axis (e.g., x-axis) and the vertical axis (e.g., y-axis). For example, score risk assessment model 500 may have an x-axis representing interaction velocity (e.g., transaction velocity, money transfer velocity, and/or the like) and/or a y-axis representing an amount (e.g., monetary amount) being transferred, a frequency of interactions (e.g., transactions, money transfers, and/or the like) higher than a threshold (e.g., selected monetary amount), and/or the like. Vector 506 may include a horizontal dimension associated with the category on the horizontal axis and/or a vertical dimension associated with a category on the vertical axis.

In some non-limiting embodiments or aspects, score risk assessment model 500 may include low risk region 502, as shown in FIG. 5. For example, low risk region 502 may indicate that an account identifier within low risk region 502 is not at high risk for suspicious group activity (e.g., money laundering). For example, a vector (e.g., vector 506) that has a length within low risk region 502 may be associated with low risk (e.g., not high risk).

In some non-limiting embodiments or aspects, score risk assessment model 500 may include high risk region 504, as shown in FIG. 5. For example, high risk region 504 may indicate that an account identifier within high risk region 504 is at high risk for suspicious group activity (e.g., money laundering). For example, a vector (e.g., vector 506) that has a length within high risk region 504 may be associated with high risk. For the purpose of illustration, as shown in FIG. 5, vector 506 has a length within high risk region 504, and therefore, the account identifier associated with vector 506 may be considered relatively high risk.

The number and arrangement of components (e.g., axes, vectors, and/or the like) shown in FIG. 5 are provided as an example. In some non-limiting embodiments or aspects, score risk assessment model 500 may include additional components (e.g., axes, vectors, and/or the like), fewer components, different components, or differently arranged components than those shown in FIG. 5.

Figure 6:
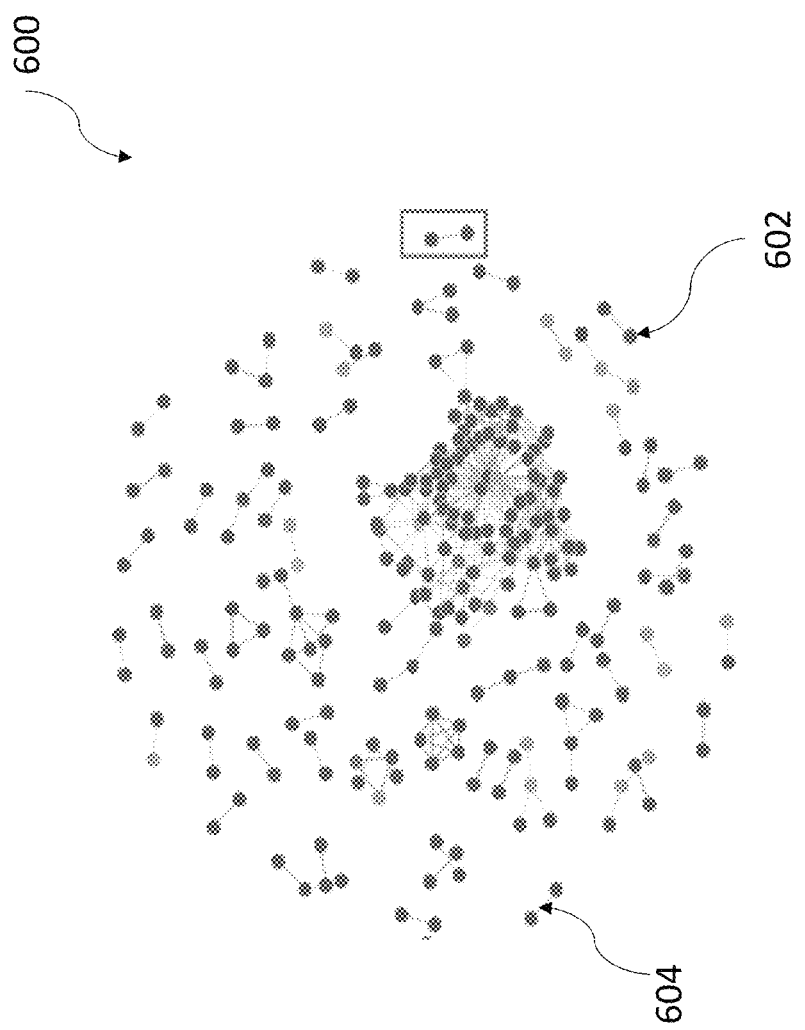
FIG. 6 is an exemplary relational graph of a non-limiting embodiment or aspect of the process in FIG. 3.

Referring now to FIG. 6, FIG. 6 is an exemplary relational graph 600 of a non-limiting embodiment or aspect relating to process 300 shown in FIG. 3. As shown in FIG. 6, relational graph 600 may include cluster data. For example, relational graph 600 may include a plurality of nodes 602 and a plurality of edges 604. Additionally or alternatively, relational graph 600 may show clusters (e.g., highly concentrated clusters and/or the like) of the plurality of nodes 602 and/or the plurality of edges 604. For example, relational graph 600 may show distinct groups of the plurality of nodes 602 with an excess of the plurality of edges 604 to each other and fewer of the plurality of edges 604 to other of the plurality of nodes 602.

In some non-limiting embodiments or aspects, the plurality of nodes 602 may represent account identifiers, interaction data, and/or the like. For example, at least one node (e.g., each node, a subset of nodes, and/or the like) of the plurality of nodes 602 may represent an account identifier (e.g., PAN, token, and/or the like).

In some non-limiting embodiments or aspects, at least one of the plurality of edges 604 may connect at least one of the plurality of nodes 602 to another at least one of the plurality of nodes 602. Additionally or alternatively, the plurality of edges 604 may build connections between at least two of the plurality of nodes 602 based on shared attributes (e.g., senders, recipients, and/or the like). For example, at least one of the plurality of edges 604 may build a connection between at least one of the plurality of nodes 602 and another at least one of the plurality of nodes 602 if the at least two plurality of nodes 602 being connected have account identifiers (e.g., PANs) sharing an attribute (e.g., the same sender).

The number and arrangement of nodes and edges shown in FIG. 6 are provided as an example. In some non-limiting embodiments or aspects, relational graph 600 may include additional nodes and/or edges, fewer nodes and/or edges, different nodes and/or edges, or differently arranged nodes and/or edges than those shown in FIG. 6.

Figure 7:
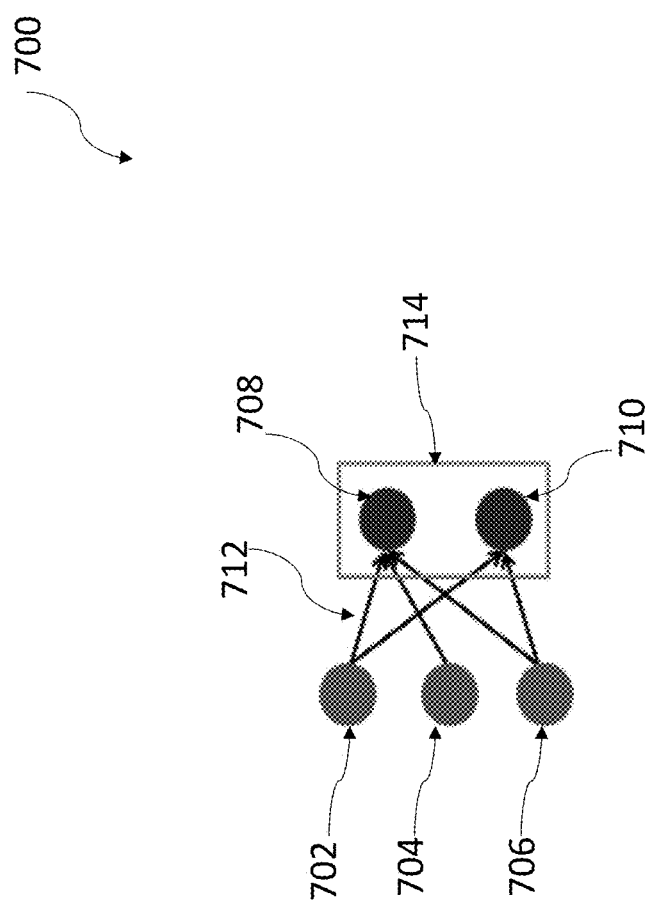
FIG. 7 is an exemplary relational graph of a non-limiting embodiment or aspect of the process in FIG. 3.

Referring now to FIG. 7, FIG. 7 is an exemplary relational graph 700 of a non-limiting embodiment or aspect of the process 300 shown in FIG. 3. As shown in FIG. 7, relational graph 700 may include a plurality of nodes 702, 704, 706, 708, 710, a plurality of edges 712, and a box 714.

In some non-limiting embodiments or aspects, relational graph 700 may be the same as, similar to, and/or part of relational graph 600.

In some non-limiting embodiments or aspects, the plurality of nodes 702, 704, 706, 708, and 710 may be the same as or similar to the plurality of nodes 602. Additionally or alternatively, the plurality of nodes 702, 704, 706, 708, and 710 may be connected by a plurality of edges 712 and/or surrounded by a box 714.

In some non-limiting embodiments or aspects, the plurality of edges 712 may be the same as or similar to the plurality of edges 604. Additionally or alternatively, each edge of the plurality of edges 712 may represent a connection between at least two of the plurality of nodes 702, 704, 706, 708, and/or 710. For example, each of the plurality of nodes 702, 704, 706, 708, and 710 may be associated with an account identifier (e.g., PAN). Additionally or alternatively, each edge 712 may connect at least two of the plurality of nodes 702, 704, 706, 708, and/or 710 if there is at least one interaction therebetween.

In some non-limiting embodiments or aspects, the box 714 may indicate that the plurality of nodes 708 and 710 contained within it have share an attribute (e.g., sender, recipient, and/or the like). For example, box 714 may indicate that the plurality of nodes 708 and 710 contained within it share at least one attribute (e.g., money sending resources, recipient destinations, exiting destinations, and/or the like). For the purpose of illustration, nodes 702, 704, and 706 may represent senders; nodes 708 and 710 may represent receivers (e.g., of interactions, such as money transfers, payment transactions, and/or the like); and/or each edge 71 may represent at least one interaction between the respective nodes connected to the ends thereof. As shown in FIG. 7, since node 702 and node 706 are senders to both of node 708 and node 710, nodes 708 and 710 may be depicted within box 714 since they share at least one sender (e.g., as shown, two sender).

The number and arrangement of nodes and edges shown in FIG. 7 are provided as an example. In some non-limiting embodiments or aspects, relational graph 700 may include additional nodes and/or edges, fewer nodes and/or edges, different nodes and/or edges, or differently arranged nodes and/or edges than those shown in FIG. 7.

Figure 8:
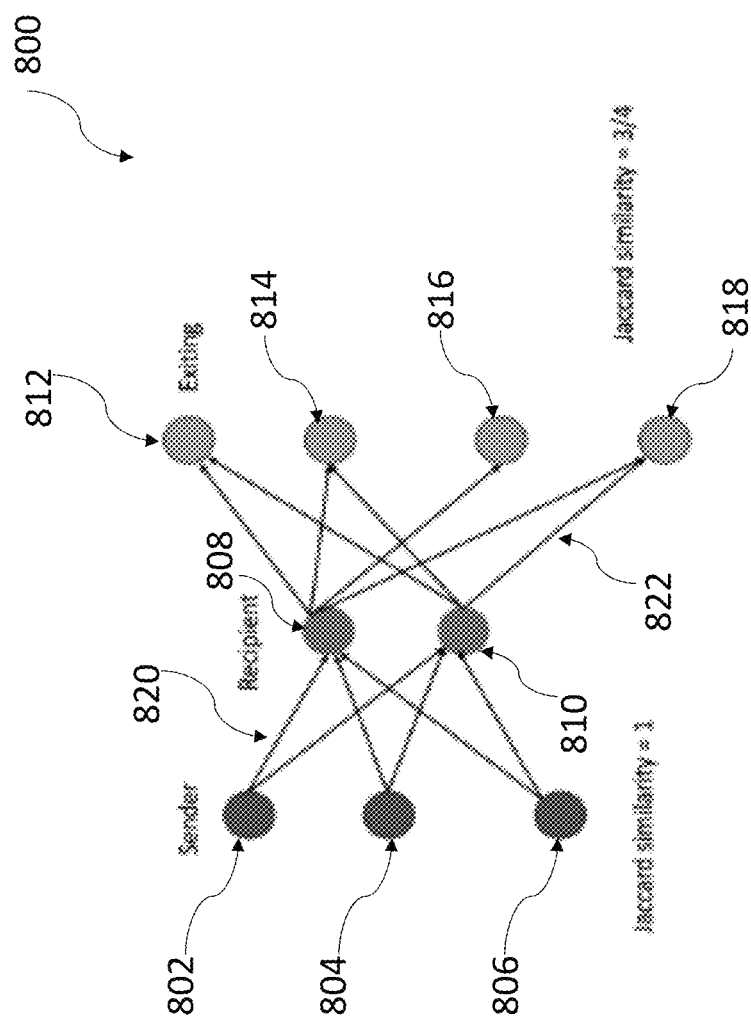
FIG. 8 is an exemplary combined relational graph, including an exemplary recipient graph and exiting graph, of a non-limiting embodiment or aspect of the process in FIG. 3.

Now referring to FIG. 8, FIG. 8 is an exemplary combined relational graph 800, including an exemplary recipient graph and exiting graph, of a non-limiting embodiment or aspect of the process 300 in FIG. 3. As shown in FIG. 8, combined relational graph 800 may include a plurality of nodes 802, 804, 806, 808, 810, 812, 814, 816, 818, and a plurality of edges 820, 822.

In some non-limiting embodiments or aspects, relational graph 800 may be the same as, similar to, or part of relational graphs 600 and/or 700.

In some non-limiting embodiments or aspects, the plurality of nodes 802, 804, 806, 808, 810, 812, 814, 816, and 818 may be the same as or similar to the plurality of nodes 602, 702, 704, 706, 708, and/or 710. Additionally or alternatively, the plurality of nodes 802, 804, 806, 808, 810, 812, 814, 816, and 818 may represent account identifiers, as described herein. Additionally or alternatively, each node 802, 804, 806, 808, 810, 812, 814, 816, 818 may be at least one of a sender (e.g., of an interaction such as a money transfer, a transaction, and/or the like), a recipient (e.g., of an interaction) or an exit (e.g., of an additional interaction, such as a subsequent money transfer from a recipient after the recipient has received at least one money transfer from a sender).

In some non-limiting embodiments or aspects, the plurality of edges 820 and 822 may be the same as and/or similar to the plurality of edges 604 and/or 712. Additionally or alternatively, the plurality of edges 820 and 822 may represent a connection (e.g., interaction) between at least two of the plurality of nodes 802, 804, 806, 808, 810, 812, 814, 816, and/or 818.

In some non-limiting embodiments or aspects, similarity (e.g., a Jaccard coefficient and/or the like) between selected nodes (e.g., at least one subset of the plurality of nodes 802, 804, 806, 808, 810, 812, 814, 816, and 818) may be determined. For example, each of nodes 802, 804, and 806 may represent senders. Additionally or alternatively, the similarity (e.g., a Jaccard coefficient and/or the like) between the sender nodes 802-806 may be determined (e.g., based on the connections of such sender nodes 802-806 to recipient nodes 808 and 810 and/or exiting nodes 812-818). For example, each of nodes 808 and 810 may represent recipients. Additionally or alternatively, the similarity (e.g., a Jaccard coefficient and/or the like) between the recipient nodes 808 and 810 may be determined (e.g., based on the connections of such recipient nodes 808 and 810 to sender nodes 802-806 and/or exiting nodes 812-818). For example, each of nodes 812-818 may represent exits (e.g., exiting nodes). Additionally or alternatively, the similarity (e.g., a Jaccard coefficient and/or the like) between the exiting nodes 812-818 may be determined (e.g., based on the connections of such exiting nodes 812-818 to recipient nodes 808 and 810 and/or sender nodes 802-806).

The number and arrangement of nodes and edges shown in FIG. 8 are provided as an example. In some non-limiting embodiments or aspects, relational graph 800 may include additional nodes and/or edges, fewer nodes and/or edges, different nodes and/or edges, or differently arranged nodes and/or edges than those shown in FIG. 8.

Figure 9:
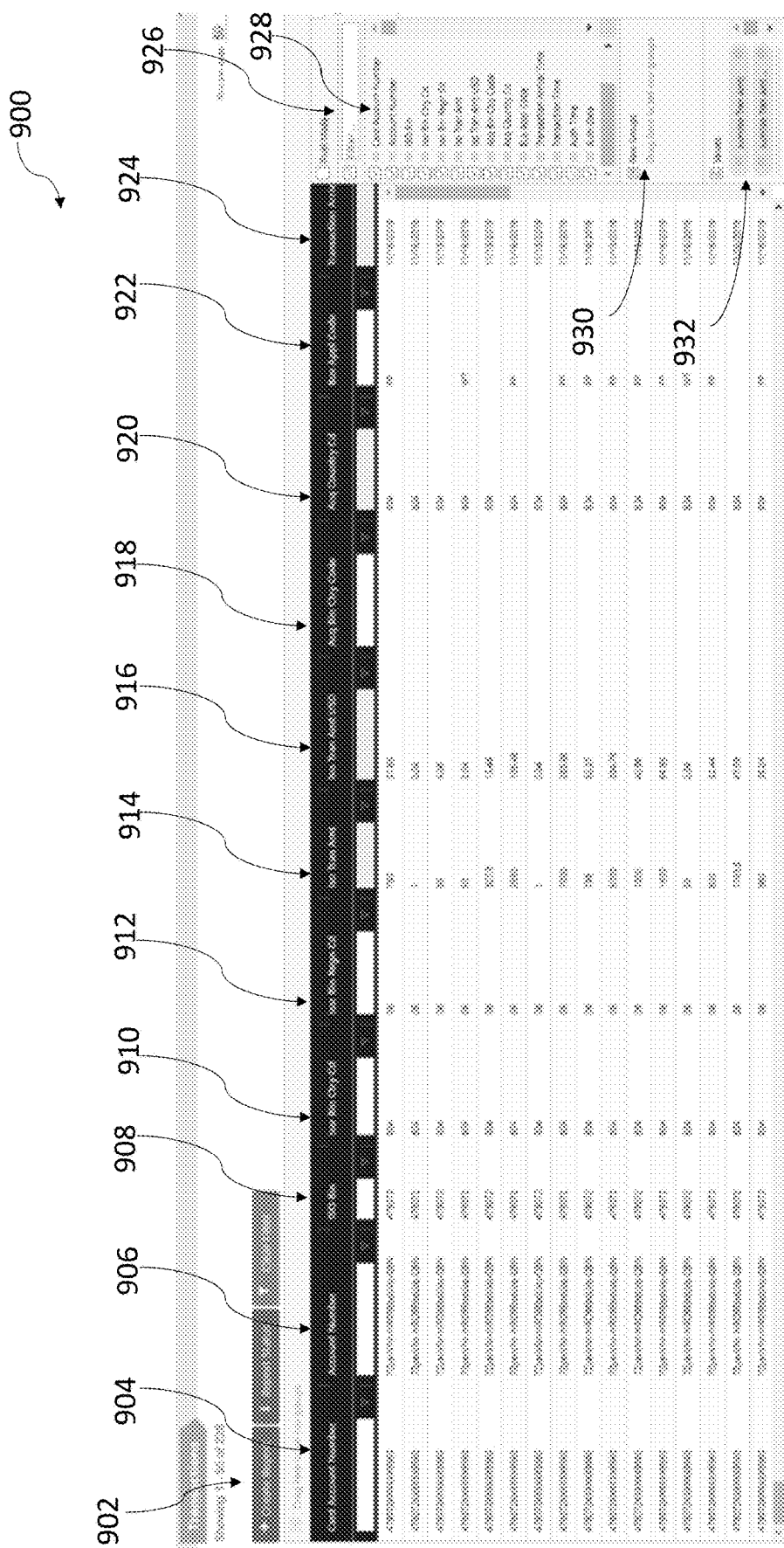
FIG. 9 is a screenshot of an exemplary graphical user interface (GUI).

Referring now to FIG. 9, FIG. 9 is a screenshot of an exemplary graphical user interface (GUI) 900. As shown in FIG. 9, GUI 900 may include buttons 902, card account number column 904, account number column 906, ISO bin column 908, issuer bin country code column 910, issuer bin region code column 912, ISO team amount column, ISO team amount U.S. dollar column 916, acquired bin country code column 918, acquired country code column 920, bus application code column 922, and transaction activity column 924, filter textbox 926, column selection checkboxes 928, row grouping area 930, value determination area 932, and/or the like. Additionally or alternatively, the GUI 900 may provide visualization of a set of metrics indicative of suspicious group activity (e.g., money laundering). Additionally or alternatively, the GUI 900 may be a network review component of the network 112 in FIG. 1.

The number and arrangement of components shown in FIG. 9 are provided as an example. In some non-limiting embodiments or aspects, GUI 900 may include additional components, fewer components, different components, or differently arranged components than those shown in FIG. 9.

Figure 10:
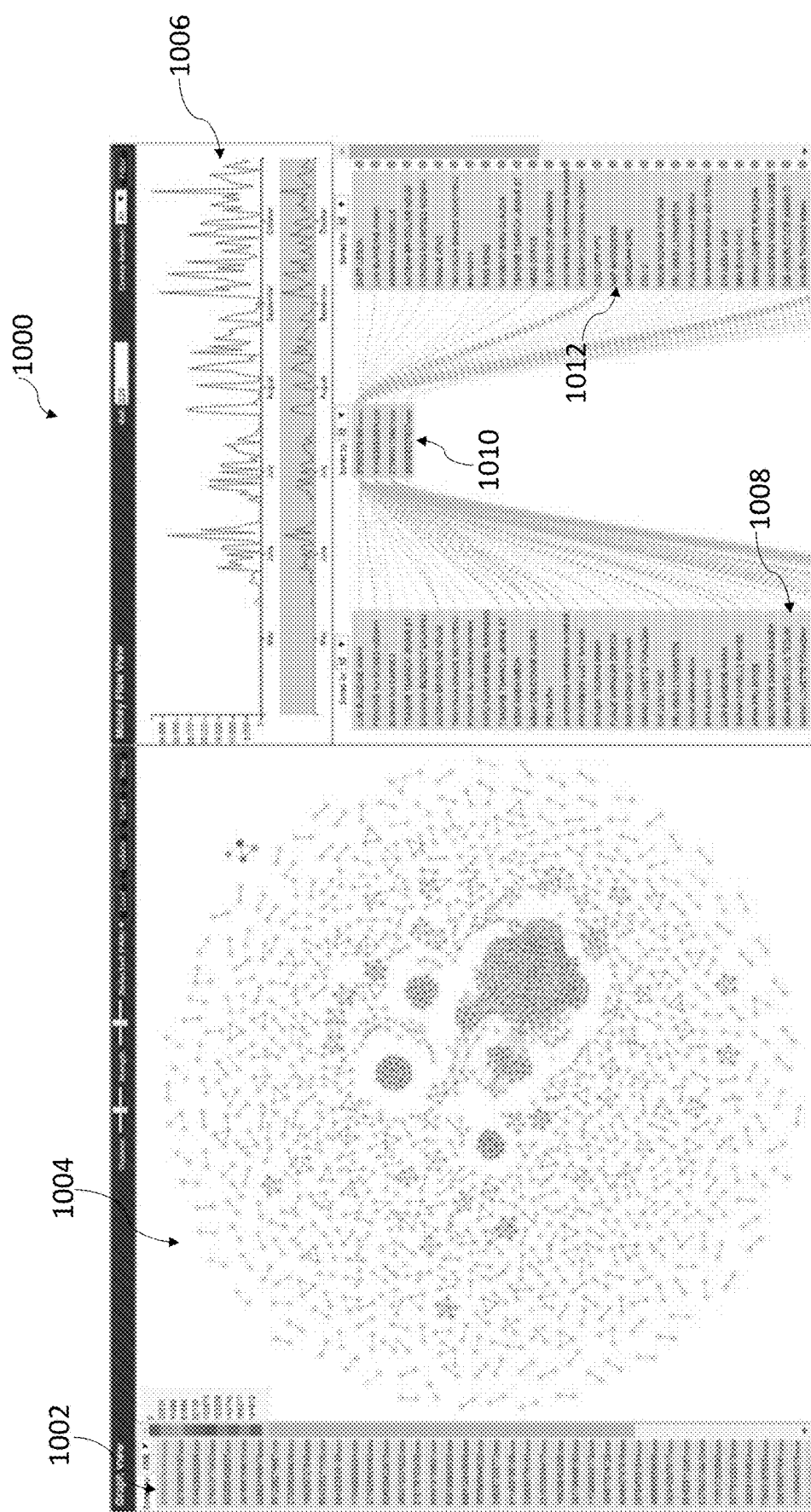
FIG. 10 is a screenshot of an exemplary GUI in graph view.

Referring now to FIG. 10, FIG. 10 is a screenshot of an exemplary GUI 1000 in graph view. As seen in FIG. 10, GUI 1000 may include account information column 1002, relational graph 1004, money flow graph 1006, and account information columns 1008, 1010, and 1012. For example, account information columns may include sender information column 1008, recipient information column 1010, and/or exiting information column 1012

In some non-limiting embodiments or aspects, account information column 1002 may be the same as or similar to columns 904, 906, 908, 910, 912, 914, 916, 918, 920, 922, and/or 924. Additionally or alternatively, account information column 1002 may contain a plurality of account identifiers (e.g., PANs). Additionally or alternatively, account information column 1002 may be sorted by level of risk associated with suspicious group activity (e.g., money laundering). For example, account information column 1002 may contain account identifiers (e.g., PANs) which may be sorted by level of risk from highest level of risk to lowest level of risk of suspicious group activity (e.g., money laundering).

In some non-limiting embodiments or aspects, relational graph 1004 may be the same as, similar to, and/or part of relational graphs 600, 700, and/or 800. Additionally or alternatively relational graph 1004 may show a plurality of nodes, a plurality of edges, and/or clusters of data representing the data and connections associated with account information column 1002. For example, relational graph 1004 may show a plurality of nodes which may each represent account identifiers (e.g., PANs), a plurality of edges connecting the plurality of nodes based on shared attributes (e.g., same senders, same recipients, same exits, and/or the like) between the respective account identifiers (e.g., PANs), and a plurality of clusters of the plurality of nodes which may indicate suspicious group activity (e.g., money laundering).

In some non-limiting embodiments or aspects, money flow graph 1006 may show money flow (e.g., inflow and/or outflow of money from a sender, receiver, and/or the like) over a period of time. For example, the horizontal axis (e.g., x-axis) of money flow graph 1006 may represent the months of the year and/or the vertical axis (e.g., y-axis) of money flow graph 1006 may represent monetary amounts.

In some non-limiting embodiments or aspects, account information columns 1008, 1010, and 1012 may be may be the same as or similar to columns 904, 906, 908, 910, 912, 914, 916, 918, 920, 922, 924, and/or 1002. Additionally or alternatively, account information columns 1008, 1010, and 1012 may be the same as or similar to relational graph 800. Additionally or alternatively, account information columns 1008, 1010, and 1012 may be sorted by categories associated with risk. For example, such categories may include average throughput, at least one cross-border interaction, at least one anti-money laundering merchant category code, at least one monitored acquirer country, decline rate, long term aggregate of transaction history, daily limit, transaction limit, at least one monitored issuer country, high dollar amount transfers, the velocity at which a transfer is made, and/or the like.

The number and arrangement of components shown in FIG. 10 are provided as an example. In some non-limiting embodiments or aspects, GUI 1000 may include additional components, fewer components, different components, or differently arranged components than those shown in FIG. 10.

Figure 11:
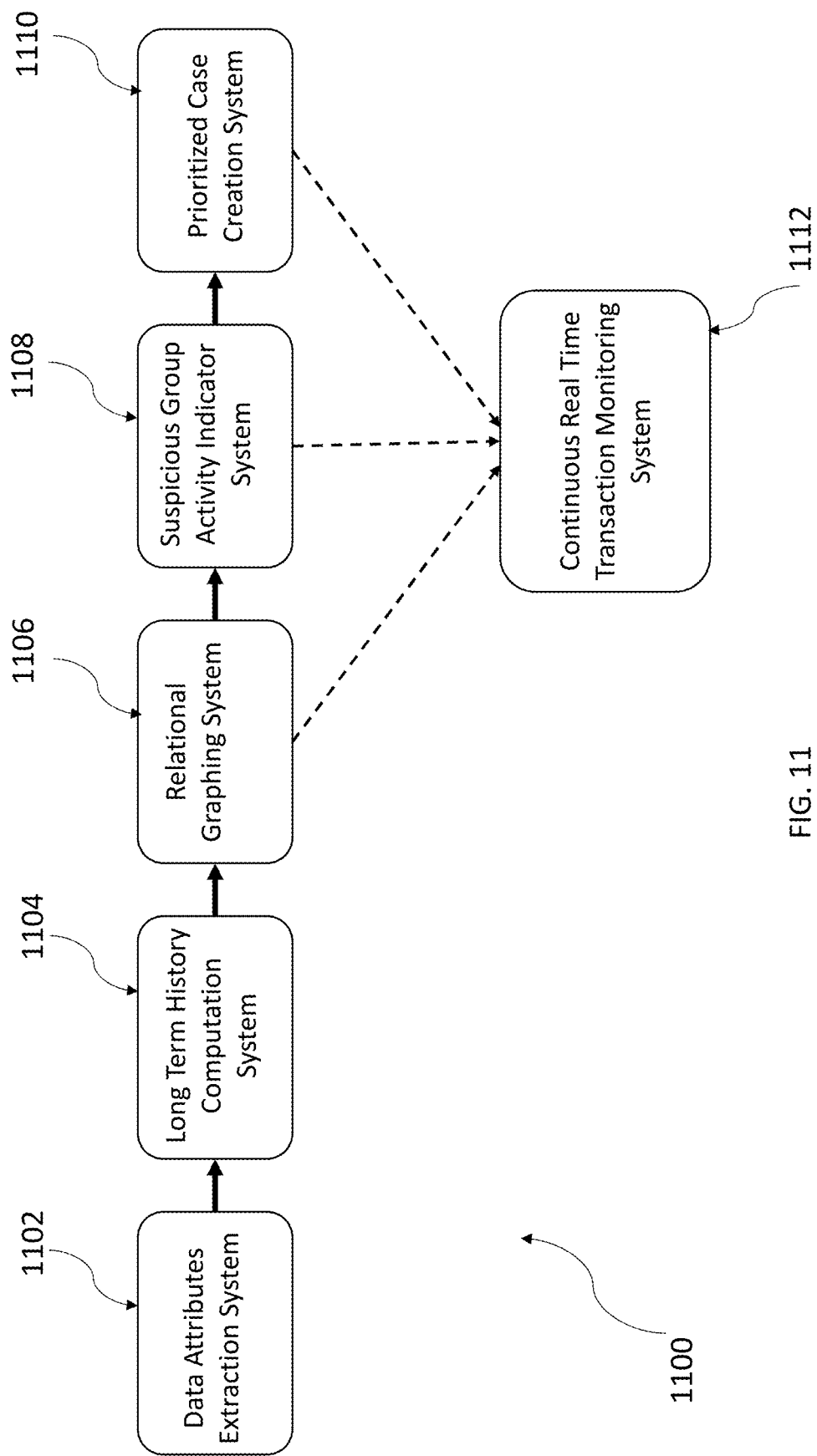
FIG. 11 is a diagram of an exemplary implementation of a non-limiting embodiment or aspect of the process in FIG. 3.

Now referring to FIG. 11, FIG. 11 is a diagram of an exemplary implementation 1100 of a non-limiting embodiment or aspect of the process in FIG. 3. As shown in FIG. 11, implementation 1100 may include data attributes extraction system 1102, long term history computation system 1104, relational graphing system 1106, suspicious group activity indicator system 1108, prioritized case creation system 1110, and continuous real time transaction monitoring system 1112. In some non-limiting embodiments or aspects, data attributes extraction system 1102, long term history computation system 1104, relational graphing system 1106, suspicious group activity indicator system 1108, prioritized case creation system 1110, and continuous real time transaction monitoring system 1112 may be the same as, similar to, and/or part of transaction service provider system 102. In some non-limiting embodiments or aspects, data attributes extraction system 1102 and/or long term history computation system 1104 may be the same as, similar to, and/or part of categorization system 406. In some non-limiting embodiments or aspects, relational graphing system 1106 may be the same as or similar to relational graphing system 404. In some non-limiting embodiments or aspects, suspicious group activity indicator system 1108 may be the same as or similar to scoring system 412.

In some non-limiting embodiments or aspects, data attributes extraction system 1102 may determine values for a set of categories (e.g., a value for each category of the set of categories). For example, data attributes extraction system 1102 may determine a value for each category of a first set of categories based on the interaction data for each account identifier associated with at least one interaction of the plurality of interactions, as described herein. Additionally or alternatively, data attributes extraction system 1102 may generate vectors. For example, data attributes extraction system 1102 may generate a vector for each account identifier associated with at least one interaction of the plurality of interactions based on the values for the first set of categories associated therewith, as described herein. Additionally or alternatively, data attributes extraction system 1102 may determine category values and/or generate vectors based on recent interactions (e.g., from stream processing). Additionally or alternatively, data attributes extraction system 1102 may determine the length of vectors. For example, data attributes extraction system 1102 may determine the length of each vector, as described herein. Additionally or alternatively, the output of data attributes extractions system 1102 may be received by long term history computation system 1104.

In some non-limiting embodiments or aspects, in response to receiving interaction data (and/or at least a portion of the output from data attributes extraction system 1102), long term history computation system 1104 may determine values for a set of categories (e.g., a value for each category of the set of categories). For example, long term history computation system 1104 may determine a value for each category of a first set of categories based on the interaction data for each account identifier associated with at least one interaction of the plurality of interactions, as described herein. Additionally or alternatively, long term history computation system 1104 may generate vectors. For example, long term history computation system 1104 may generate a vector for each account identifier associated with at least one interaction of the plurality of interactions based on the values for the first set of categories associated therewith, as described herein. Additionally or alternatively, long term history computation system 1104 may determine category values and/or generate vectors based on non-recent interactions (e.g., from distributed storage). Additionally or alternatively, long term history computation system 1104 may determine the length of vectors. For example, long term history computation system 1104 may determine the length of each vector, as described herein. Additionally or alternatively, the output of long term history computation system 1104 may be received by relational graphing system 1106.

In some non-limiting embodiments or aspects, relational graphing system 1106 may be the same as, similar to, and/or part of relational graphing system 404. Additionally or alternatively, in response to receiving interaction data (e.g., and/or the output from data attributes extraction system 1102 and/or long term history computation system 1104), relational graphing system 1106 may generate at least one relational graph. For example, relational graphing system 1106 may generate at least one relational graph and/or combined graph based on the interaction data, as described herein. Additionally or alternatively, relational graphing system 1106 may output cluster data. Additionally or alternatively, the cluster data (and/or the at least one relational graph and/or combined graph) generated by relational graphing system 1106 may be received by suspicious group activity indicator system 1108 and/or continuous real time transaction monitoring system 1112.

In some non-limiting embodiments or aspects, in response to receiving the output from data attributes extraction system 1102, long term history computation system 1104, and/or relational graphing system 1106, suspicious group activity indicator system 1108 may determine at least one score. For example, suspicious group activity indicator system 1108 may determine a score (e.g., cluster score) for each cluster (e.g., of the at least one cluster) based on the length of the vector (e.g., risk score) associated with the account identifier (e.g., PAN) of each of the cluster of nodes. Additionally or alternatively, the score(s) may be the output of suspicious group activity indicator system 1108. Additionally or alternatively, the score(s) may be used to determine the likelihood of suspicious group activity (e.g., money laundering). For example, at least one score may surface activities at the account identifier (e.g., PAN) level relevant to a specific group activity. Additionally or alternatively, suspicious group activity indicator 1108 may generate at least one score risk assessment model. For example, suspicious group activity indicator system 1108 may generate at least one score risk assessment model based on the vector data and/or cluster data (and/or the at least one relational graph and/or combined graph). Additionally or alternatively, the at least one score risk assessment model generated by suspicious group activity indicator system 1108 may be the same as or similar to score risk assessment model 500. Additionally or alternatively, the at least one score risk assessment model generated by suspicious group activity indicator system 1108 may be received by prioritized case creation system 1110 and/or continuous real time transaction monitoring system 1112.

In some non-limiting embodiments or aspects, in response to receiving the output from suspicious group activity indicator system 1108, prioritized case creation system 1110 may generate at least one list of cases prioritized by level of risk (e.g., score). For example, prioritized case creation system 1110 may generate at least one list of cases prioritized by highest level to lowest level of risk of suspicious group activity (e.g., money laundering), e.g., as indicated by score generated by suspicious group activity indicator system 1108, by at least one risk assessment model generated by suspicious group activity indicator system 1108, and/or the like. Additionally or alternatively, the at least one list of cases prioritized by level of risk may be received by continuous real time transaction monitoring system 1112.

In some non-limiting embodiments or aspects, continuous real time transaction monitoring system 1112 may receive outputs from relational graphing system 1106, suspicious group activity indicator system 1108, and/or prioritized case creation system 1110. Additionally or alternatively, continuous real time transaction monitoring system 1112 may continuously monitor interaction data in real time. For example, continuous real time transaction monitoring system 1112 may receive at least one list of cases from prioritized case creation system 1110 which may be used to continuously monitor the risk levels of suspicious group activity (e.g., money laundering) for the cases on the list in real time.

The number and arrangement of systems shown in FIG. 11 are provided as an example. In some non-limiting embodiments or aspects, implementation 1100 may include additional systems, fewer systems, different systems, or differently arranged systems than those shown in FIG. 11. Additionally or alternatively, a set of systems (e.g., one or more systems) of implementation 1100 may perform one or more functions described as being performed by another set of systems of implementation 1100.

Figure 12:
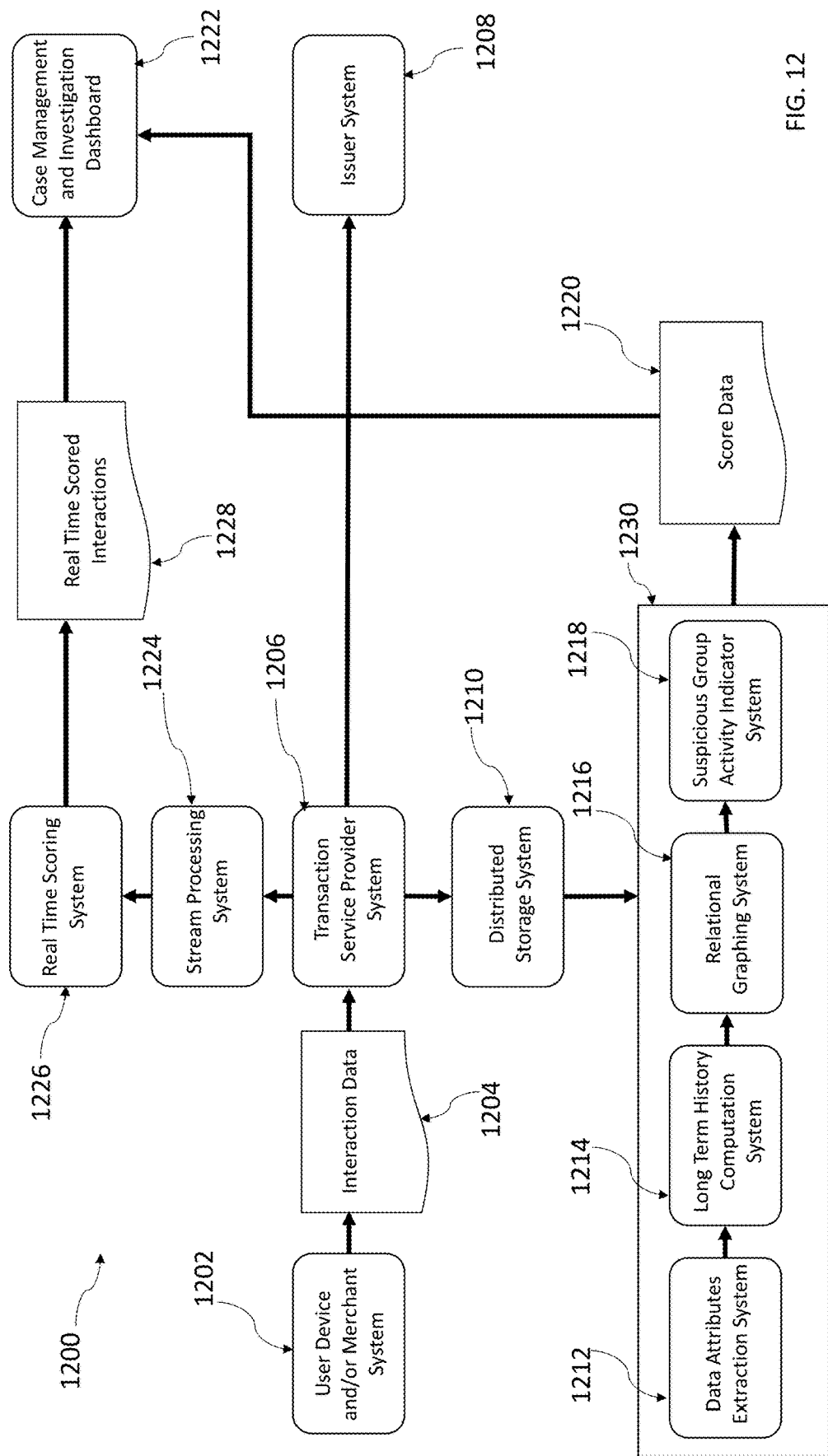
FIG. 12 is a diagram of an implementation of a non-limiting embodiment of the process in FIG. 3.

Now referring to FIG. 12, FIG. 12 is FIG. 12 is a diagram of an implementation 1200 of a non-limiting embodiment or aspect of the process in FIG. 3. As shown in FIG. 12, implementation 1200 may include user device and/or merchant system 1202, interaction data 1204, transaction service provider system 1206, issuer system 1208, distributed storage system 1210, data attributes extraction system 1212, long term history computation system 1214, relational graphing system 1216, suspicious group activity indicator system 1218, score data 1220, case management and investigation and dashboard 1222, stream processing system 1224, real time scoring system 1226, real time scored interactions 1228, and arrangement of systems 1230. In some non-limiting embodiments or aspects, the implementation 1200 may be used to monitor accounts associated with risk in real time. In some non-limiting embodiments or aspects, transaction service provider system 1206, distributed storage system 1210, data attributes extraction system 1212, long term history computation system 1214, relational graphing system 1216, suspicious group activity indicator system 1218, score data 1220, case management and investigation and dashboard 1222, stream processing system 1224, real time scoring system 1226, and real time scored interactions 1228 may be the same as, similar to, and/or part of transaction service provider system 102.

In some non-limiting embodiments or aspects, user device and/or merchant system 1202 may be the same as, similar to, and/or part of the customer device 106 and/or merchant system 108. Additionally or alternatively, user device and/or merchant system 1202 may include one or more devices capable of receiving information from and/or communicating information to transaction service provider system 1206. Additionally or alternatively, user device and/or merchant system 1202 may include a client device, a group of client devices, a computing device, such as a server, a group of servers, and/or other like devices. For example, user device and/or merchant system 1202 may include a client device that allows a merchant to communicate information to transaction service provider system 1206. Additionally or alternatively, user device and/or merchant system 1202 may be associated with a merchant as described herein. Additionally or alternatively, user device and/or merchant system 1202 may communicate information which may be interpreted as interaction data 1204. For example, user device and/or merchant system 1202 may communicate information such as account identifying information which may then be interpreted as interaction data 1204 by transaction service provider system 1206.

In some non-limiting embodiments or aspects, interaction data 1204 may be the same as, similar to, and/or part of interaction data 402. Additionally or alternatively, interaction data 1204 may be a communication or communications from user device and/or merchant system 1202. Additionally or alternatively, interaction data 1204 may be received by transaction service provider system 1206. For example, interaction data 1202 may receive a communication from user device and/or merchant system 1202 which may contain account identifying information that may be sent to transaction service provider system 1206.

In some non-limiting embodiments or aspects, transaction service provider system 1206 may receive interaction data 1204. Additionally or alternatively, transaction service provider system 1206 may include one or more devices capable of receiving information from and/or communicating information to issuer system 1208, distributed storage system 1210, and/or stream processing system 1224. For example, transaction service provider system 1206 may include a computing device such as a server (e.g., a transaction processing server), a group of servers, and/or other like devices. Additionally or alternatively, transaction service provider system 1206 may be associated with a transaction service provider as described herein. Additionally or alternatively, transaction service provider system 1206 may be capable of receiving information from, storing information in, communicating information to, and/or searching information stored in distributed storage system 1210.

In some non-limiting embodiments or aspects, issuer system 1208 may be the same as, similar to, and/or part of issuer system 104. Additionally or alternatively, issuer system 1208 may include one or more devices capable of receiving information from and/or communicating information to transaction service provider 1206. For example, issuer system 1208 may include a computing device such as a server, a group of servers and/or other like devices. Additionally or alternatively, issuer system 1208 may be associated with an issuer institution as described herein. For example, issuer system 1208 may be associated with an issuer institution that issued a credit account, debit account, credit card, debit card, and/or the like to a user associated with user device and/or merchant system 1202.

In some non-limiting embodiments or aspects, distributed storage system 1210 may include one or more devices capable of receiving information from and/or communicating information to transaction service provider system 1206. Additionally or alternatively, distributed storage system 1210 may include at least one data storage device, which may be local or remote to transaction service provider system 1206. Additionally or alternatively, distributed storage system 1210 may include a plurality of data storage devices (e.g., clusters of computing devices and/or the like), such as at least one Hadoop cluster and/or the like. Additionally or alternatively, distributed storage system 1210 may store information. Additionally or alternatively, distributed storage system 1210 may be capable of communicating information to any one or more of data attributes extraction system 1212, long term history computation system 1214, relational graphing system 1216, and/or suspicious group activity indicator system 1218 of arrangement of systems 1230.

In some non-limiting embodiments or aspects, arrangement of systems 1230 may be the same as, similar to, and/or part of the arrangement of systems 1100 as shown in FIG. 11. In some non-limiting embodiments or aspects, arrangement of systems 1230 may include data attributes extraction system 1212, long term history computation system 1214, relational graphing system 1216, and/or suspicious group activity indicator system 1218.

In some non-limiting embodiments or aspects, data attributes extraction system 1212 may be the same as, similar to, or part of categorization system 406 and/or data attributes extraction system 1102. Additionally or alternatively, data attributes extraction system 1212 may determine values for a set of categories (e.g., a value for each category of the set of categories). For example, data attributes extraction system 1212 may determine a value for each category of a first set of categories based on the interaction data for each account identifier associated with at least one interaction of the plurality of interactions, as described herein. Additionally or alternatively, data attributes extraction system 1212 may generate vectors. For example, data attributes extraction system 1212 may generate a vector for each account identifier associated with at least one interaction of the plurality of interactions based on the values for the first set of categories associated therewith, as described herein. Additionally or alternatively, data attributes extraction system 1212 may determine category values and/or generate vectors based on recent interactions (e.g., from stream processing). Additionally or alternatively, data attributes extraction system 1212 may determine the length of vectors. For example, data attributes extraction system 1212 may determine the length of each vector, as described herein. Additionally or alternatively, the output of data attributes extractions system 1212 may be received by long term history computation system 1214.

In some non-limiting embodiments or aspects, long term history computation system 1214 may be the same as, similar to, and/or part of categorization system 406 and/or long term history computation system 1104. Additionally or alternatively, in response to receiving an output from data attributes extraction system 1212, long term history computation system 1214 may determine values for a set of categories (e.g., a value for each category of the set of categories). For example, long term history computation system 1214 may determine a value for each category of a first set of categories based on the interaction data for each account identifier associated with at least one interaction of the plurality of interactions, as described herein. Additionally or alternatively, long term history computation system 1214 may generate vectors. For example, long term history computation system 1214 may generate a vector for each account identifier associated with at least one interaction of the plurality of interactions based on the values for the first set of categories associated therewith, as described herein. Additionally or alternatively, long term history computation system 1214 may determine category values and/or generate vectors based on non-recent interactions (e.g., from distributed storage). Additionally or alternatively, long term history computation system 1214 may determine the length of vectors. For example, long term history computation system 1214 may determine the length of each vector, as described herein. Additionally or alternatively, the output of long term history computation system 1214 may be received by relational graphing system 1216.

In some non-limiting embodiments or aspects, relational graphing system 1216 may be the same as, similar to, or part of relational graphing system 404 and/or 1106. Additionally or alternatively, in response to receiving interaction data (e.g., and/or the output from data attributes extraction system 1212 and/or long term history computation system 1212), relational graphing system 1216 may generate at least one relational graph. For example, relational graphing system 1216 may generate at least one relational graph and/or combined graph based on the interaction data, as described herein. Additionally or alternatively, relational graphing system 1216 may output cluster data. Additionally or alternatively, the cluster data (and/or the at least one relational graph and/or combined graph) generated by relational graphing system 1216 may be received by suspicious group activity indicator system 1218.

In some non-limiting embodiments or aspects, suspicious group activity indicator system 1218 may be the same as, similar to, and/or part of suspicious group activity indicator system 1108. Additionally or alternatively, in response to receiving the output from data attributes extraction system 1212m long term history computation system 1214, and/or relational graphing system 1216, suspicious group activity indicator system 1218 may determine at least one score. For example, suspicious group activity indicator system 1218 may determine a score (e.g., cluster score) for each cluster (e.g., of the at least one cluster) based on the length of the vector (e.g., risk score) associated with the account identifier (e.g., PAN) of each of the cluster of nodes. Additionally or alternatively, the score(s) may be the output of suspicious group activity indicator system 1218. Additionally or alternatively, the score(s) may be used to determine the likelihood of suspicious group activity (e.g., money laundering). For example, at least one score may surface activities at the account identifier (e.g., PAN) level relevant to a specific group activity. Additionally or alternatively, suspicious group activity indicator 1218 may generate at least one score risk assessment model. For example, suspicious group activity indicator system 1218 may generate at least one score risk assessment model based on the vector data and/or cluster data (and/or the at least one relational graph and/or combined graph). Additionally or alternatively, the at least one score risk assessment model generated by suspicious group activity indicator system 1218 may be the same as or similar to score risk assessment model 500. Additionally or alternatively, score data 1220 may be an output of suspicious group activity indicator system 1218.

In some non-limiting embodiments or aspects, score data 1220 may be the same as, similar to, and/or part of score 414. Additionally or alternatively, score data 1220 may be received by case management and investigation dashboard 1222, which may be the same as, similar to, and/or part of prioritized case creation system 1110. For example, score data 1220 may include a list of account identifiers and scores associated therewith, which may be prioritized (e.g., ordered) by level of risk (e.g., be score) (or by another criterion such as account identifier and/or the like). Score data 1220 may be viewed on the case management and investigation dashboard 1222.

In some non-limiting embodiments or aspects, stream processing system 1224 may receive a communication or communications from transaction service provider system 1206. Additionally or alternatively, stream processing system 1224 may be a stream processing software platform for handling real time feeds (e.g., Kafka). Additionally or alternatively, stream processing system 1224 may receive interaction data from transaction service provider system 1206 and/or communicate (e.g., make available and/or the like) the interaction data to real time scoring system 1226.

In some non-limiting embodiments or aspects, based on interaction data from stream processing system 1224, real time scoring system 1226 may determine at least one real time score. For example, real time scoring system 1226 may determine a real time score for at least one interaction of the interaction data and/or at least one account identifier associated therewith based on the interaction data (e.g., using existing models for fraud detection, anti-money laundering, and/or the like). Additionally or alternatively, real time scoring system 1226 may output real time scored interactions 1228 (e.g., interaction data including the real time score for each interaction and/or for each account identifier associated with at least one interaction).

In some non-limiting embodiments or aspects, real time scored interactions 1228 may indicate whether or not an action is to be taken. For example, real time scored interactions 1228 may include an interaction or transaction that has been identified to be at a high level of risk for suspicious group activity (e.g., money laundering) which may prompt an action (e.g., denying at least one further interaction or transaction) based on the score. Additionally or alternatively, real time scored interactions 1228 may be received by case management and investigation dashboard 1222. For example, real time scored interactions 1228 may include a list of interactions and/or account identifiers, which may be prioritized by highest level to lowest level of risk (e.g., real time score), and/or real time score interactions 1228 may be viewed on the case management and investigation dashboard 1222.

In some non-limiting embodiments or aspects, case management and investigation dashboard 1222 may receive score data 1220 and/or real time scored interactions 1228. Additionally or alternatively, the transaction service provider (and/or issuer), as described herein, may open an investigation based on the score data 1220 and/or real time scored interactions 1228 based on information indicating the level of risk which may be viewed on case management and investigation dashboard 1222.

The number and arrangement of systems, devices, and/or components shown in FIG. 12 are provided as an example. In some non-limiting embodiments or aspects, implementation 1200 may include additional systems, devices, and/or components, fewer systems, devices, and/or components, different systems, devices, and/or components, or differently arranged systems, devices, and/or components than those shown in FIG. 12. Additionally or alternatively, a set of systems, devices, and/or components (e.g., one or more systems, devices, and/or components) of implementation 1200 may perform one or more functions described as being performed by another set of systems, devices, and/or components of implementation 1200.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A computer-implemented method for detecting group activities in a network based on unsupervised machine learning techniques, comprising:

receiving, by a transaction service provider system, interaction data associated with a plurality of interactions, the interaction data for each interaction of the plurality of interactions including account identifier data associated with at least one account identifier, the at least one account identifier comprising a payment token mapped to a primary account number (PAN);

storing, by the transaction service provider system, the interaction data for each interaction of the plurality of interactions in a distributed storage system;

receiving, by a data attributes extraction system, the interaction data for each interaction of the plurality of interactions from the distributed storage system;

for each account identifier associated with at least one interaction of the plurality of interactions, determining, by the data attributes extraction system, a value for each category of a first set of categories based on the interaction data;

for each account identifier associated with at least one interaction of the plurality of interactions, generating, by the data attributes extraction system, a vector for each account identifier associated with at least one interaction of the plurality of interactions based on inputting the value for each category of the first set of categories into at least one machine learning model, wherein the at least one machine learning model provides the vector for each account identifier associated with at least one interaction of the plurality of interactions as an output;

determining, by the data attributes extraction system, a length of each vector based on the value for each category of the first set of categories of a respective vector, wherein the length of each vector is associated with a risk score;

generating, by a relational graphing system, at least one relational graph based on the interaction data received from the data attributes extraction system, each relational graph associated with a respective category of a second set of categories, each relational graph comprising a plurality of nodes and a plurality of edges, the plurality of nodes comprising a node for each account identifier associated with at least one interaction of the plurality of interactions, the plurality of edges comprising an edge connecting each respective node of the plurality of nodes with each other node of the plurality of nodes having a same value of the respective category as the respective node;

determining, by a suspicious group activity indicator system, at least one cluster of nodes based on the at least one relational graph received from the relational graphing system using an unsupervised cluster detection technique;

determining, by the suspicious group activity indicator system, a score for each cluster of the at least one cluster using an unsupervised machine learning score risk assessment model based on the length of the vector associated with the account identifier of each node of the cluster of nodes;

updating, by the suspicious group activity indicator system, the unsupervised machine learning score risk assessment model in real time without pre-training the unsupervised machine learning score risk assessment model to provide an updated model;

outputting, by the suspicious group activity indicator system, score data for each cluster of the at least one cluster based on the updated model;

denying, by the transaction service provider system, at least one further interaction based on the score data from the suspicious group activity indicator system for one or more clusters of the at least one cluster; and opening, by at least one of the transaction service provider system or a continuous real time transaction monitoring system, a case investigation based on the score for one or more clusters of the at least one cluster.

2. The method of claim 1, wherein the plurality of interactions comprises a plurality of payment transactions, and wherein the account identifier data for each payment transaction of the plurality of payment transactions comprises at least one of a primary account number (PAN), a payment token, or any combination thereof.

3. The method of claim 1, wherein the at least one relational graph comprises a plurality of relational graphs, the method further comprising:

combining, by the relational graphing system, the plurality of relational graphs to form a combined graph, the combined graph comprising the plurality of nodes and a plurality of weighted edges, the plurality of edges comprising a weighted edge corresponding to each edge of the plurality of edges of all of the plurality of relational graphs, a weight of each respective weighted edge based on a number of the plurality of relational graphs having at least one edge of the plurality of edges thereof corresponding to the respective weighted edge.

4. The method of claim 3, wherein determining the at least one cluster of nodes comprises determining the at least one cluster of nodes based on the combined graph, and wherein determining the score comprises determining a weighted score for each cluster of the at least one cluster based on the length of the vector associated with the account identifier of each respective node of the cluster of nodes and the weight of the weighted edges connected to each respective node of the cluster of nodes, wherein the score comprises the weighted score.

5. The method of claim 4, wherein the weighted score comprises at least one of a weighted average based on the length of the vector associated with the account identifier of each respective node of the cluster of nodes and the weight of the weighted edges connected to each respective node of the cluster of nodes, a multiplication product based on the length of the vector associated with the account identifier of each respective node of the cluster of nodes and the weight of the weighted edges connected to each respective node of the cluster of nodes, or any combination thereof.

6. The method of claim 1, wherein a first subset of the first set of categories comprises a second subset of the second set of categories.

7. The method of claim 1, wherein the at least one account identifier comprises a first account identifier associated with a sender and a second account identifier associated with a receiver.

8. The method of claim 7, wherein the second set of categories comprises a sender category, and wherein the at least one relational graph comprises a sender relational graph, the plurality of edges of the sender relational graph comprising the edge connecting each respective node of the plurality of nodes with each other node of the plurality of nodes having the first account identifier associated with the sender of at least one interaction associated with the other node matching the first account identifier associated with the sender of at least one interaction associated with the respective node.

9. The method of claim 7, wherein the second set of categories comprises a receiver category, and wherein the at least one relational graph comprises a receiver relational graph, the plurality of edges of the receiver relational graph comprising the edge connecting each respective node of the plurality of nodes with each other node of the plurality of nodes having the second account identifier associated with the receiver of at least one interaction associated with the other node matching the second account identifier associated with the receiver of at least one interaction associated with the respective node.

10. The method of claim 1, wherein the unsupervised cluster detection technique comprises at least one of a community detection algorithm, a random walk algorithm, or any combination thereof.

11. The method of claim 1, further comprising at least one of:
communicating, by at least one of the transaction service provider system or the continuous real time transaction monitoring system, at least one notification based on the score;
displaying, by at least one of the transaction service provider system or the continuous real time transaction monitoring system, a graphical user interface based on the score; or
any combination thereof.

12. A system for detecting group activities in a network based on unsupervised machine learning techniques, comprising:
a transaction service provider system
configured to:
receive interaction data associated with a plurality of interactions, the interaction data for each interaction of the plurality of interactions including account identifier data associated with at least one account identifier, the at least one account identifier comprising a payment token mapped to a primary account number (PAN);
store the interaction data for each interaction of the plurality of interactions in a distributed storage system;
a data attributes extraction system configured to:
receive the interaction data for each interaction of the plurality of interactions from the distributed storage system;
for each account identifier associated with at least one interaction of the plurality of interactions, determine a value for each category of a first set of categories based on the interaction data;
for each account identifier associated with at least one interaction of the plurality of interactions, generate a vector for each account identifier associated with at least one interaction of the plurality of interactions based on inputting the value for each category of the first set of categories into at least one machine learning model, wherein the at least one machine learning model provides the vector for each account identifier associated with at least one interaction of the plurality of interactions as an output;
determine a length of each vector based on the value for each category of the first set of categories of a respective vector, wherein the length of each vector is associated with a risk score;
a relational graphing system configured to:
generate at least one relational graph based on the interaction data received from the data attributes extraction system, each relational graph associated with a respective category of a second set of categories, each relational graph comprising a plurality of nodes and a plurality of edges, the plurality of nodes comprising a node for each account identifier associated with at least one interaction of the plurality of interactions, the plurality of edges comprising an edge connecting each respective node of the plurality of nodes with each other node of the plurality of nodes having a same value of the respective category as the respective node;
a suspicious group activity indicator system configured to:
determine at least one cluster of nodes based on the at least one relational graph received from the relational graphing system using an unsupervised cluster detection technique;
determine a score for each cluster of the at least one cluster using an unsupervised machine learning score risk assessment model based on the length of the vector associated with the account identifier of each node of the cluster of nodes;
update the unsupervised machine learning score risk assessment model in real time without pre-training the unsupervised machine learning score risk assessment model to provide an updated model;
output score data for each cluster of the at least one cluster based on the updated model;
wherein the transaction service provider system is further configured to:
deny at least one further interaction based on the score data from the suspicious group activity indicator system for one or more clusters of the at least one cluster; and
wherein at least one of the transaction service provider system or a continuous real time transaction monitoring system is further configured to:
open a case investigation based on the score for one or more clusters of the at least one cluster.

13. The system of claim 12, wherein the plurality of interactions comprises a plurality of payment transactions, and wherein the account identifier data for each payment transaction of the plurality of payment transactions comprises at least one of a primary account number (PAN), a payment token, or any combination thereof.

14. The system of claim 12, wherein the at least one relational graph comprises a plurality of relational graphs, and wherein the relational graphing system is further configured to:
combine the plurality of relational graphs to form a combined graph, the combined graph comprising the plurality of nodes and a plurality of weighted edges, the plurality of edges comprising a weighted edge corresponding to each edge of the plurality of edges of all of the plurality of relational graphs, a weight of each respective weighted edge based on a number of the plurality of relational graphs having at least one edge of the plurality of edges thereof corresponding to the respective weighted edge.

15. The system of claim 14, wherein determining the at least one cluster of nodes comprises determining the at least one cluster of nodes based on the combined graph, and
wherein determining the score comprises determining a weighted score for each cluster of the at least one cluster based on the length of the vector associated with the account identifier of each respective node of the cluster of nodes and the weight of the weighted edges connected to each respective node of the cluster of nodes, wherein the score comprises the weighted score.

16. The system of claim 15, wherein the weighted score comprises at least one of a weighted average based on the length of the vector associated with the account identifier of each respective node of the cluster of nodes and the weight of the weighted edges connected to each respective node of the cluster of nodes, a multiplication product based on the length of the vector associated with the account identifier of each respective node of the cluster of nodes and the weight of the weighted edges connected to each respective node of the cluster of nodes, or any combination thereof.

17. The system of claim 12, wherein a first subset of the first set of categories comprises a second subset of the second set of categories.

18. The system of claim 12, wherein the at least one account identifier comprises a first account identifier associated with a sender and a second account identifier associated with a receiver.

19. The system of claim 12, wherein at least one of the transaction service provider system or the continuous real time transaction monitoring system is further configured to:
communicate at least one notification based on the score;
display a graphical user interface based on the score; or any combination thereof.

20. A computer program product for detecting group activities in a network based on unsupervised machine learning techniques, the computer program product comprising at least one non-transitory computer-readable medium including one or more instructions that, when executed by at least one processor, cause the at least one processor to:
receive, by a transaction service provider system, interaction data associated with a plurality of interactions, the interaction data for each interaction of the plurality of interactions including account identifier data associated with at least one account identifier, the at least one account identifier comprising a payment token mapped to a primary account number (PAN);
store, by the transaction service provider system, the interaction data for each interaction of the plurality of interactions in a distributed storage system;
receive, by a data attributes extraction system, the interaction data for each interaction of the plurality of interactions from the distributed storage system;
for each account identifier associated with at least one interaction of the plurality of interactions, determine, by the data attributes extraction system, a value for each category of a first set of categories based on the interaction data;
for each account identifier associated with at least one interaction of the plurality of interactions, generate, by the data attributes extraction system, a vector for each account identifier associated with at least one interaction of the plurality of interactions based on inputting the value for each category of the first set of categories into at least one machine learning model, wherein the at least one machine learning model provides the vector for each account identifier associated with at least one interaction of the plurality of interactions as an output;
determine, by the data attributes extraction system, a length of each vector based on the value for each category of the first set of categories of a respective vector, wherein the length of each vector is associated with a risk score;
generate, by a relational graphing system, at least one relational graph based on the interaction data received from the data attributes extraction system, each relational graph associated with a respective category of a second set of categories, each relational graph comprising a plurality of nodes and a plurality of edges, the plurality of nodes comprising a node for each account identifier associated with at least one interaction of the plurality of interactions, the plurality of edges comprising an edge connecting each respective node of the plurality of nodes with each other node of the plurality of nodes having a same value of the respective category as the respective node;
determine, by a suspicious group activity indicator system, at least one cluster of nodes based on the at least one relational graph received from the relational graphing system using an unsupervised cluster detection technique;
determine, by the suspicious group activity indicator system, a score for each cluster of the at least one cluster using an unsupervised machine learning score risk assessment model based on the length of the vector associated with the account identifier of each node of the cluster of nodes;
update, by the suspicious group activity indicator system, the unsupervised machine learning model score risk assessment model in real time without pre-training the unsupervised machine learning score risk assessment model to provide an updated model;
output, by the suspicious group activity indicator system, score data for each cluster of the at least one cluster based on the updated model;
deny, by the transaction service provider system, at least one further interaction based on the score data from the suspicious group activity indicator system for one or more clusters of the at least one cluster; and
open, by at least one of the transaction service provider system or a continuous real time transaction monitoring system, a case investigation based on the score for one or more clusters of the at least one cluster.

* * * * *